US011900863B2

(12) United States Patent
He et al.

(10) Patent No.: US 11,900,863 B2
(45) Date of Patent: Feb. 13, 2024

(54) DISPLAY PANEL AND DISPLAY DEVICE

(71) Applicant: Wuhan Tianma Microelectronics Co., Ltd. Shanghai Branch, Shanghai (CN)

(72) Inventors: Mengjia He, Wuhan (CN); Yana Gao, Wuhan (CN); Zhi Liu, Wuhan (CN); Yuying Cai, Wuhan (CN); Xingyao Zhou, Wuhan (CN)

(73) Assignee: Wuhan Tianma Microelectronics Co., Ltd. Shanghai Branch, Shanghai (CN)

( * ) Notice: Subject to any disclaimer, the term of this patent is extended or adjusted under 35 U.S.C. 154(b) by 0 days.

(21) Appl. No.: 17/929,825

(22) Filed: Sep. 6, 2022

(65) Prior Publication Data

US 2023/0222962 A1 Jul. 13, 2023

(30) Foreign Application Priority Data

Jun. 29, 2022 (CN) ........................ 202210761525.1

(51) Int. Cl.
*G09G 3/32* (2016.01)

(52) U.S. Cl.
CPC ......... *G09G 3/32* (2013.01); *G09G 2330/021* (2013.01); *G09G 2330/04* (2013.01)

(58) Field of Classification Search
CPC . G09G 3/32; G09G 2330/021; G09G 2330/04
See application file for complete search history.

(56) References Cited

U.S. PATENT DOCUMENTS 6,531,996 B1 * 3/2003 Murade ................ G09G 3/3648 345/98
8,309,901 B2 * 11/2012 Satoh .................... G01J 1/4228 250/214 AL
9,482,891 B2 * 11/2016 Sekine ................ G02F 1/13306
10,121,406 B2 * 11/2018 Jang ..................... G09G 3/2092
10,706,803 B2 * 7/2020 Furuta ....................... G09G 3/20
11,443,674 B2 * 9/2022 Hong ..................... G11C 19/28
2010/0045642 A1 * 2/2010 Satoh .................... H01L 23/552 345/98
2015/0277172 A1 * 10/2015 Sekine ............. G02F 1/133345 349/43

FOREIGN PATENT DOCUMENTS

CN 110400811 B 12/2021

* cited by examiner

*Primary Examiner* — Gene W Lee
(74) *Attorney, Agent, or Firm* — CHRISTENSEN O'CONNOR JOHNSON KINDNESS PLLC

(57) ABSTRACT

A display panel and a display device, including a substrate, a circuit layer located at a side of the substrate, and a top light-shielding layer configured to receive a voltage signal. The circuit layer includes a light-emitting shift circuit, including a first output module and a control module. The first output module is electrically connected to a first node, a first fixed potential signal line, and a light-emitting control signal line and is configured to, in response to a voltage of the first node, transmit a light-emitting enable voltage provided by the first fixed-potential signal line to the light-emitting control signal line. The control module is connected to the first node and includes a control transistor. The top light-shielding layer is located at a side of the control transistor. In a direction perpendicular to the substrate, the top light-shielding layer overlaps with a channel of the control transistor.

20 Claims, 15 Drawing Sheets

DISPLAY PANEL AND DISPLAY DEVICE

CROSS-REFERENCE TO RELATED APPLICATION

The present application claims priority to Chinese Patent Application No. 202210761525.1, filed on Jun. 29, 2022, the content of which is incorporated herein by reference in its entirety.

TECHNICAL FIELD

The present disclosure relates to the field of display technologies, and particularly, to a display panel and a display device.

BACKGROUND

Display panels include a light-emitting shift circuit electrically connected to a sub-pixel through a light-emitting control signal line configured to provide a light-emitting control signal to the sub-pixel to control a light-emitting state of the sub-pixel.

The light-emitting shift circuit includes multiple transistors. However, when the transistor is affected by external factors, such as light, a threshold voltage of the transistor is prone to drift, thereby affecting the operation reliability of the light-emitting shift circuit. For example, when affected by the characteristics of the transistor, the light-emitting shift circuit may have voltage instability when outputting a light-emitting enable voltage level, causing the jump of the output signal, thereby affecting the light-emitting state of the sub-pixel. This may even make the sub-pixel unable to emit light normally due to function failure of the light-emitting shift circuit, which seriously affects the display performance.

SUMMARY

A first aspect of the present disclosure provides a display panel, including a substrate, a circuit layer located at a side of the substrate, and a top light-shielding layer configured to receive a voltage signal. In an embodiment, the circuit layer includes a light-emitting shift circuit. In an embodiment, the light-emitting shift circuit includes a first output module and at least one control module. In an embodiment, the first output module is electrically connected to a first node, a first fixed potential signal line, and a light-emitting control signal line, and is configured to, in response to a voltage of the first node, transmit a light-emitting enable voltage provided by the first fixed-potential signal line to the light-emitting control signal line. In an embodiment, the at least one control module is electrically connected to the first node and includes at least one control transistor. In an embodiment, the top light-shielding layer is located at a side of the at least one control transistor facing away from the substrate. In an embodiment, in a direction perpendicular to a plane of the substrate, the top light-shielding layer overlaps with a channel of one or more of the at least one control transistor.

A second aspect of the present disclosure provides a display device. In an embodiment, the display device includes a display panel, including a substrate, a circuit layer located at a side of the substrate, and a top light-shielding layer configured to receive a voltage signal. In an embodiment, the circuit layer includes a light-emitting shift circuit. In an embodiment, the light-emitting shift circuit includes a first output module and at least one control module. In an embodiment, the first output module is electrically connected to a first node, a first fixed potential signal line, and a light-emitting control signal line, and is configured to, in response to a voltage of the first node, transmit a light-emitting enable voltage provided by the first fixed-potential signal line to the light-emitting control signal line. In an embodiment, the at least one control module is electrically connected to the first node and includes at least one control transistor. In an embodiment, the top light-shielding layer is located at a side of the at least one control transistor facing away from the substrate. In an embodiment, in a direction perpendicular to a plane of the substrate, the top light-shielding layer overlaps with a channel of one or more of the at least one control transistor.

BRIEF DESCRIPTION OF DRAWINGS

In order to better illustrate technical solutions of embodiments of the present disclosure, the accompanying drawings used herein in the embodiments are briefly described below. The drawings described below are merely a part of some embodiments of the present disclosure. Based on these drawings, those skilled in the art can obtain other drawings.

DESCRIPTION OF EMBODIMENTS

In order to better illustrate the technical solutions of the present disclosure, some embodiments of the present disclosure are described in detail below with reference to the accompanying drawings.

It should be clear that the described embodiments are only some of the embodiments of the present disclosure, rather than all of the embodiments. Based on the embodiments described in the present disclosure, all other embodiments obtained by those of ordinary skill in the art shall fall within a scope of the present disclosure.

The terms used in some embodiments of the present disclosure are used only for the purpose of describing specific embodiments, and are not intended to limit the present disclosure. As used in some embodiments of the present disclosure and the appended claims, the singular forms "a/an" "the" and "said" are also intended to include the plural forms as well, unless the context clearly dictates otherwise. It should be understood that, although the transistor, control module, top light-shielding layer, capacitor, node may be described using the terms of "first", "second", "third", etc., in the embodiments of the present disclosure, the transistor, control module, top light-shielding layer, capacitor will not be limited to these terms. These terms are merely used to distinguish these ones from one another. For example, without departing from the scope of the embodiments of the present disclosure, a first transistor may also be referred to as a second transistor, similarly, a second transistor may also be referred to as a first transistor, similarly, a second transistor electrode may also be referred to as a third transistor, etc.

It should be understood that the term "and/or" used in this document is only an association relationship to describe the associated objects, indicating that there can be three relationships, for example, A and/or B, which can indicate that A alone, A and B, and B alone. The character "/" in this document generally indicates that the related objects are an "or" relationship.

Figure 1:
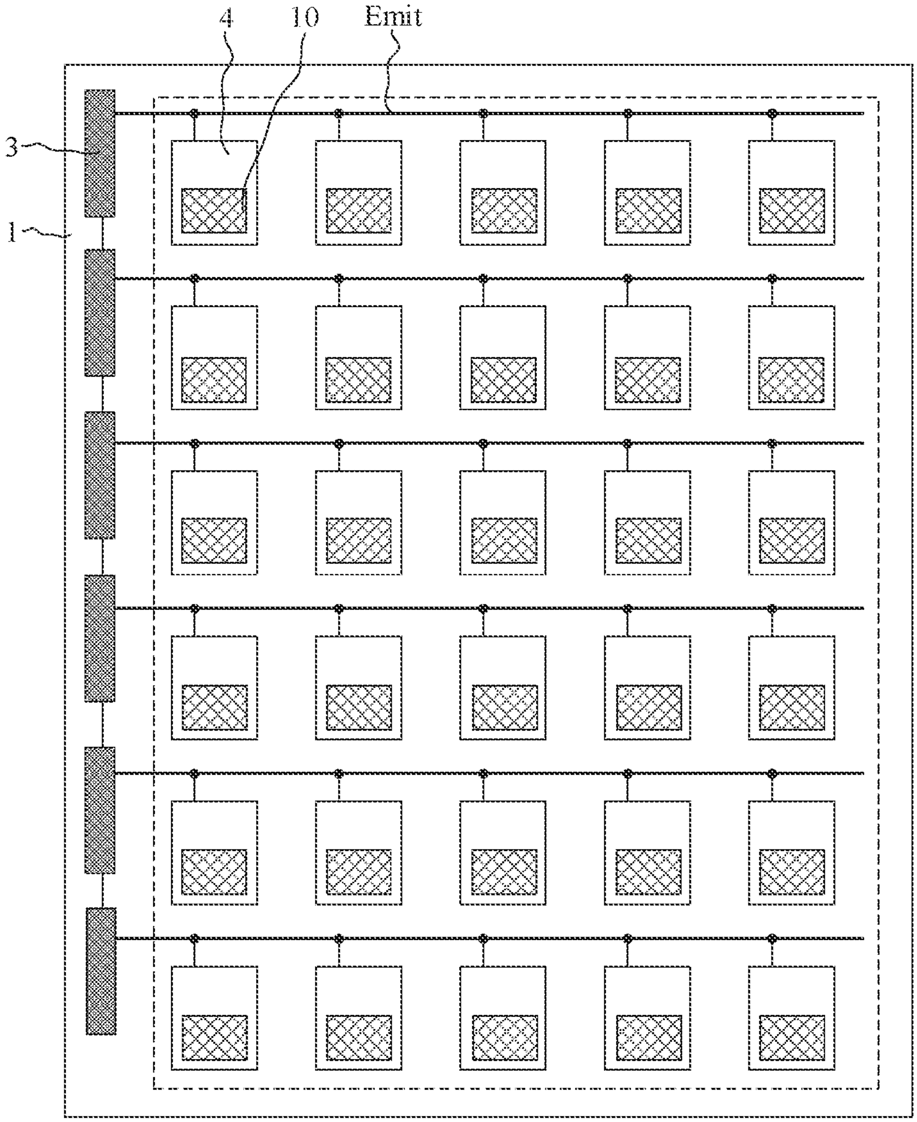
FIG. 1 is a top view of a display panel provided by some embodiments of the present disclosure.
Figure 2:
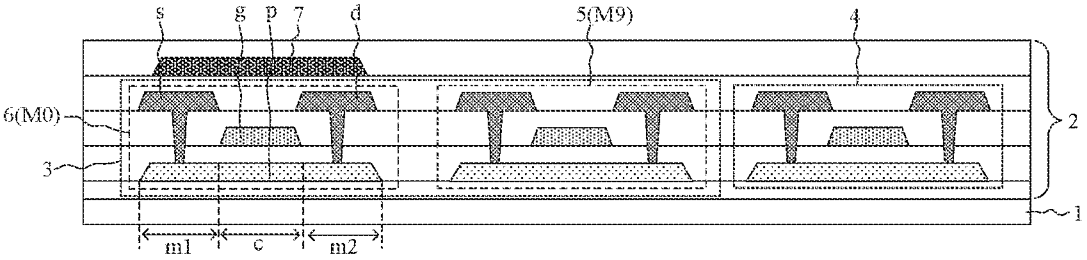
FIG. 2 is a cross-sectional view of a display panel provided by some embodiments of the present disclosure.

FIG. 1 is a top view of a display panel provided by some embodiments of the present disclosure, and FIG. 2 is a cross-sectional view of a display panel provided by some embodiments of the present disclosure. In some embodiments of the present disclosure. As shown in FIG. 1 and FIG. 2, the display panel includes a substrate 1 and a circuit layer 2 located at a side of the substrate 1. The circuit layer 2 includes a light-emitting shift circuit 3 and a pixel circuit 4, and the light-emitting shift circuit 3 is electrically connected to the pixel circuit 4 through a light-emitting control signal line Emit and is configured to provide a control signal to the pixel circuit 4. The pixel circuit 4 is electrically connected to a light-emitting element 10 and is configured to drive the light-emitting element 10 to emit light in response to the light-emitting control signal.

Figure 3:
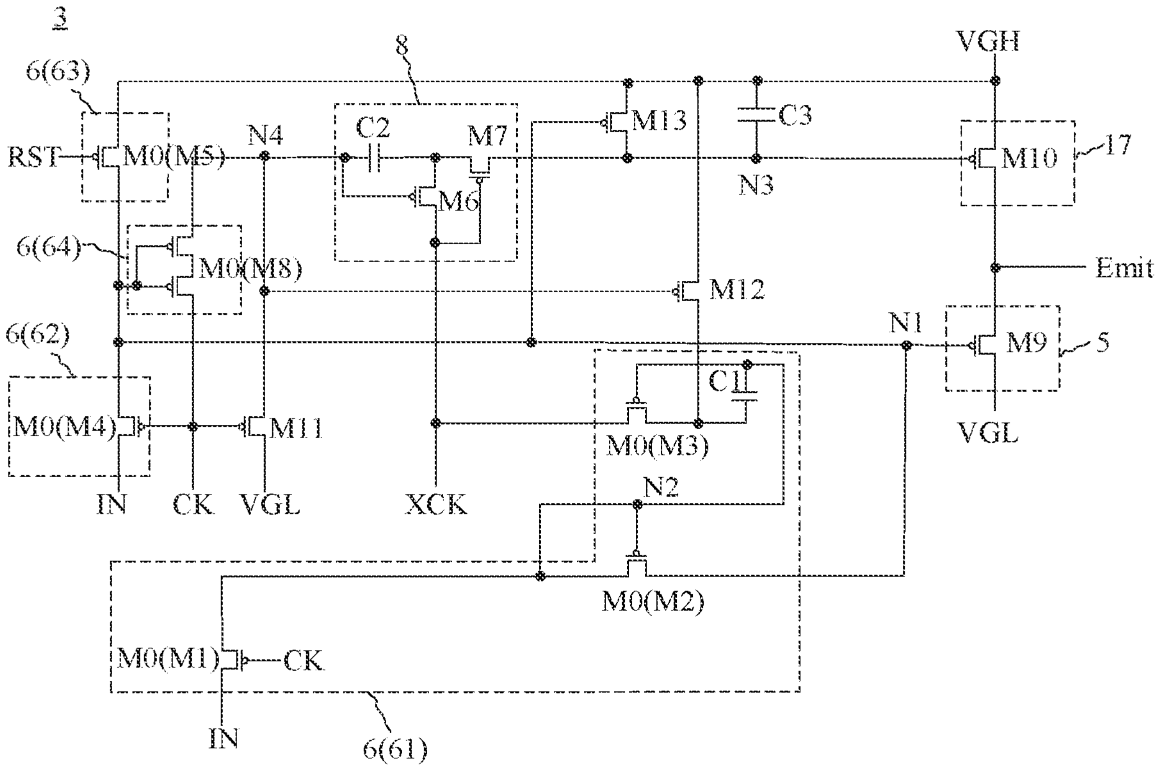
FIG. 3 is a schematic circuit diagram of a light-emitting shift circuit provided by some embodiments of the present disclosure.
Figure 4:
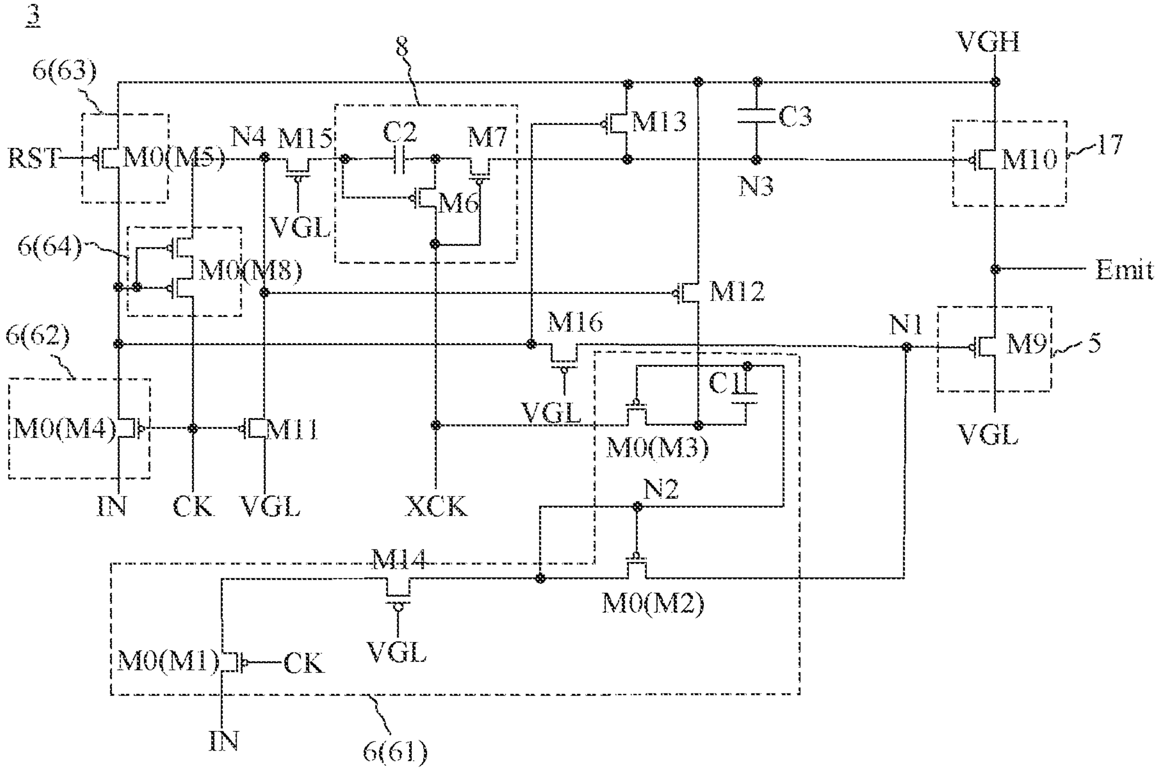
FIG. 4 is a schematic circuit diagram of another light-emitting shift circuit provided by some embodiments of the present disclosure.

FIG. 3 is a schematic diagram of a light-emitting shift circuit 3 provided by some embodiments of the present disclosure, and FIG. 4 is a schematic diagram of another light-emitting shift circuit 3 provided by some embodiments of the present disclosure. As shown in FIG. 3 and FIG. 4, the light-emitting shift circuit 3 includes a first output module 5, and the first output module 5 is electrically connected to a first node N1, a first fixed potential signal line VGL, and the light-emitting control signal line Emit. The first output module 5 is configured to transmit a light-emitting enable voltage provided by the first fixed-potential signal line VGL to the light-emitting control signal line Emit in response to a voltage of the first node N1. The light-emitting shift circuit 3 includes at least one control module 6 electrically connected to the first node and the control module 6 includes one or more control transistors M0.

Referring to FIG. 2, the display panel includes a top light-shielding layer 7 located at a side of the control transistor M0 facing away from the substrate 1, and the top light-shielding layer 7 overlaps with a channel of at least one control transistor M0 in a direction perpendicular to a plane of the substrate 1. The top light-shielding layer 7 is configured to receive a voltage signal.

In some embodiments, with reference to FIG. 2, the control transistor M0 includes an active layer p, a gate electrode g, a first electrode s, and a second electrode d. The active layer p includes a first doping region m1 electrically connected to the first electrode s, a second doping region m2 electrically connected to the second electrode d, and a channel c located between the first doping region m1 and the second doping region m2. In an example, the top light-shielding layer 7 overlapping with the channel of the control transistor M0 means that the top light-shielding layer 7 overlaps with the channel c of the active layer p of the control transistor M0.

According to the structure of the light-emitting shift circuit 3, the first output module 5 outputs the light-emitting enable voltage (low level) in response to the voltage of the first node N1. If the potential of the first node N1 is not stable, a conduction degree of the transistor in the output module 5 varies, as a result, the signal output by the first output module 5 is unstable and cannot maintain a constant low potential, thereby affecting the light-emitting stale of the light-emitting element 10. The control module 6 is directly connected to the first node N1, therefore, the characteristics of elements of the control transistor M0 in the control module 6 affects the potential of the first node N1, thereby greatly affecting the stability of the light-emitting enable voltage output by the first output module 5.

In the embodiments of the present disclosure, the top light-shielding layer 7 is provided. On the one hand, the top light-shielding layer 7 can block external ambient light from the top of the display panel, so as to prevent the external ambient light from reaching the channel of the control transistor M0, thereby reducing an effect of the light on a threshold voltage of the control transistor M0 and thus preventing the threshold value of the control transistor M0 from being forward biased. In this way, the reliability of the working state of the control transistor M0 in the control module 6 can be improved, thereby avoiding an effect on the voltage of the first node N1. Therefore, the light-emitting shift circuit 3 can output a stable low level during a light-emitting phase, thereby increasing the accuracy of the light-emitting brightness of the element 10.

On the other hand, the circuit layer 2 is provided with a large number of metal wires for forming transistors or signal lines, when the top light-shielding layer 7 is located at a side of the control transistor M0 facing away from the substrate 1. It is equivalent that the top light-shielding layer 7 is arranged inside the layer of the display panel. In this case, signals can be transmitted on the top light-shielding layer 7 by making the top light-shielding layer 7 receive a voltage signal, to prevent a large-area metal layer without signals from affecting the electrical characteristics of the transistors in the circuit layer 2.

In some embodiments, referring to FIG. 3, the control module 6 includes a first control module 61, and the control transistors M0 in the first control module 61 include a first transistor M1 and a second transistor M2. A gate electrode of the first transistor M1 is electrically connected to a first clock signal line CK, a first electrode of the first transistor M1 is electrically connected to a shift control signal line IN, and a second electrode of the first transistor M1 is electrically connected to a second node N2. A gate electrode and a first electrode of the second transistor M2 are electrically connected to the second node N2, and a second electrode of the second transistor M2 is electrically connected to the first node N1.

Figure 5:
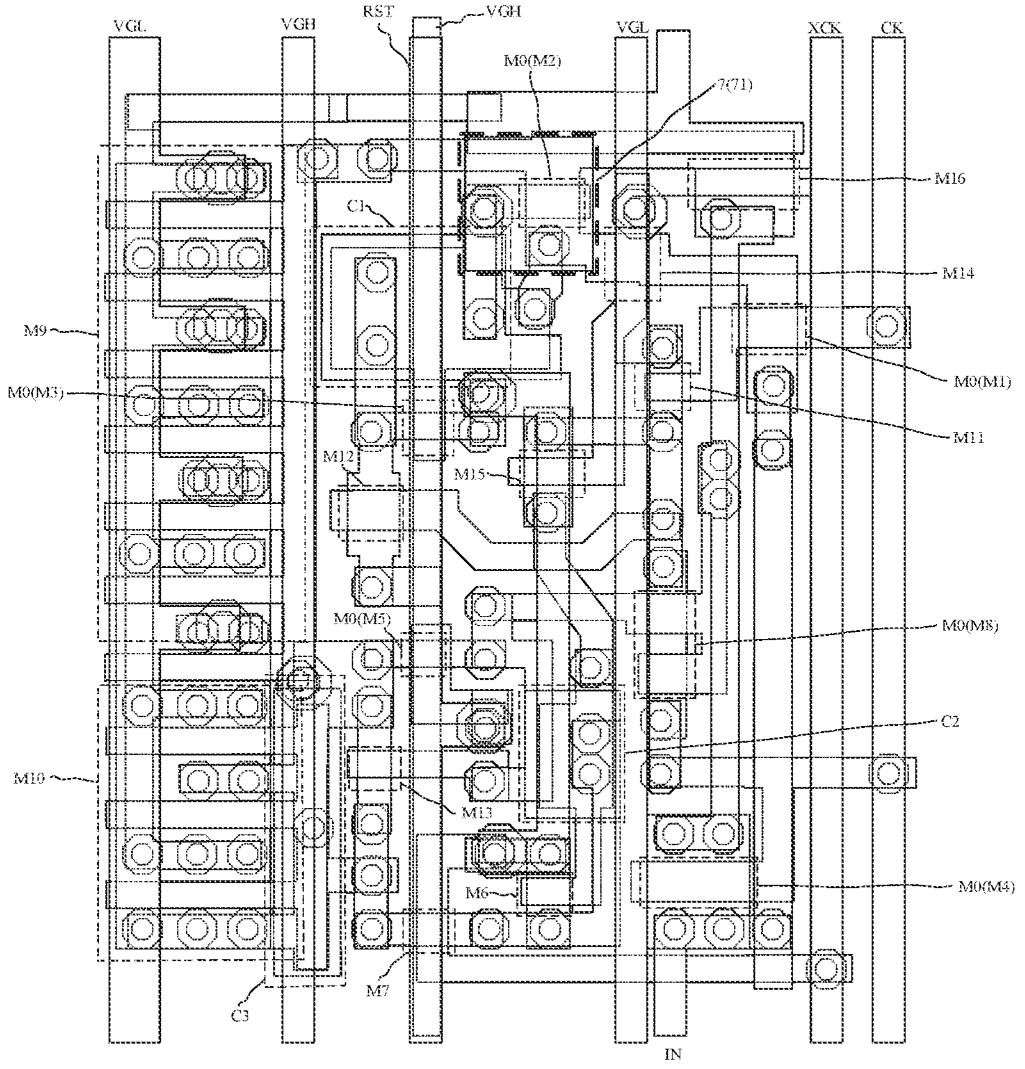
FIG. 5 is a schematic diagram illustrating a layer structure of a display panel according to some embodiments of the present disclosure.

FIG. 5 is a schematic diagram illustrating a layer structure of a display panel provided by some embodiments of the present disclosure. In some embodiments, as shown in FIG. 5, the top light-shielding layer 7 includes a first top light-shielding layer 71. In the direction perpendicular to the plane of the substrate 1, the first top light-shielding layer 71 overlaps with a channel of the second transistor M2.

It is found that the element characteristics of the second transistor M2 in the light-emitting shift circuit 3 directly affects the stability of the output signal of the light-emitting shift circuit 3. Combining the above circuit structure, it can be seen that the gate electrode of the second transistor M2 is electrically connected to the first electrode of the second transistor M2, and in this case, the second transistor M2 is equivalent to a unidirectional-conducted diode. In an embodiment, during the light-emitting phase, the shift control signal line IN provides a low potential, the second transistor M2 is normally turned on, and the second transistor M2 transmits a low potential provided by the shift control signal line IN to the first node N1, and then the first output module 5 is controlled to transmit the light-emitting enable voltage (low level) transmitted by the first fixed-potential signal line VGL to the light-emitting control signal line Emit.

However, if the threshold voltage of the second transistor M2 is forward shifted because the second transistor M2 is affected by the external ambient such as light, it will affect the magnitude of the potential written to the first node N1 through the second transistor M2, as a result, the potential of the first node N1 is raised. After the potential of the first node N1 is raised, the ability of the first output module 5 to output a low level is weakened. In this case, the signal transmitted by the light-emitting shift circuit 3 to the light-emitting control signal line Emit generates a small jump, making the output potential be raised to offset the ideal lighting enable voltage. As a result, the light-emitting brightness of the light-emitting element 10 becomes low, or even fails to emit light normally, which causes the function failure of the light-emitting shift circuit 3.

Therefore, in the embodiments of the present disclosure, the first top light-shielding layer 71 shields the channel of the second transistor M2, thereby reducing the effect of light on the threshold voltage of the second transistor M2 and preventing the threshold voltage of the second transistor M2 from being forward biased. In this way, the light-emitting shift circuit 3 can output a stable light-emitting enable voltage during the light-emitting phase to a greater extent, thereby ensuring the accuracy of light-emitting brightness of the light-emitting element 10.

In some embodiments, referring to FIG. 3 and FIG. 4 again, the control transistor M0 in the first control module 61 includes a third transistor M3, a gate electrode of the third transistor M3 is electrically connected to the second node N2, and a first electrode of the third transistor M3 is electrically connected to a second clock signal line XCK. The first control module 61 can include a first capacitor C1, a first electrode plate of the first capacitor C1 is electrically connected to the second node N2, and a second electrode plate of the first capacitor C1 is electrically connected to a second electrode of the third transistor M3.

Figure 6:
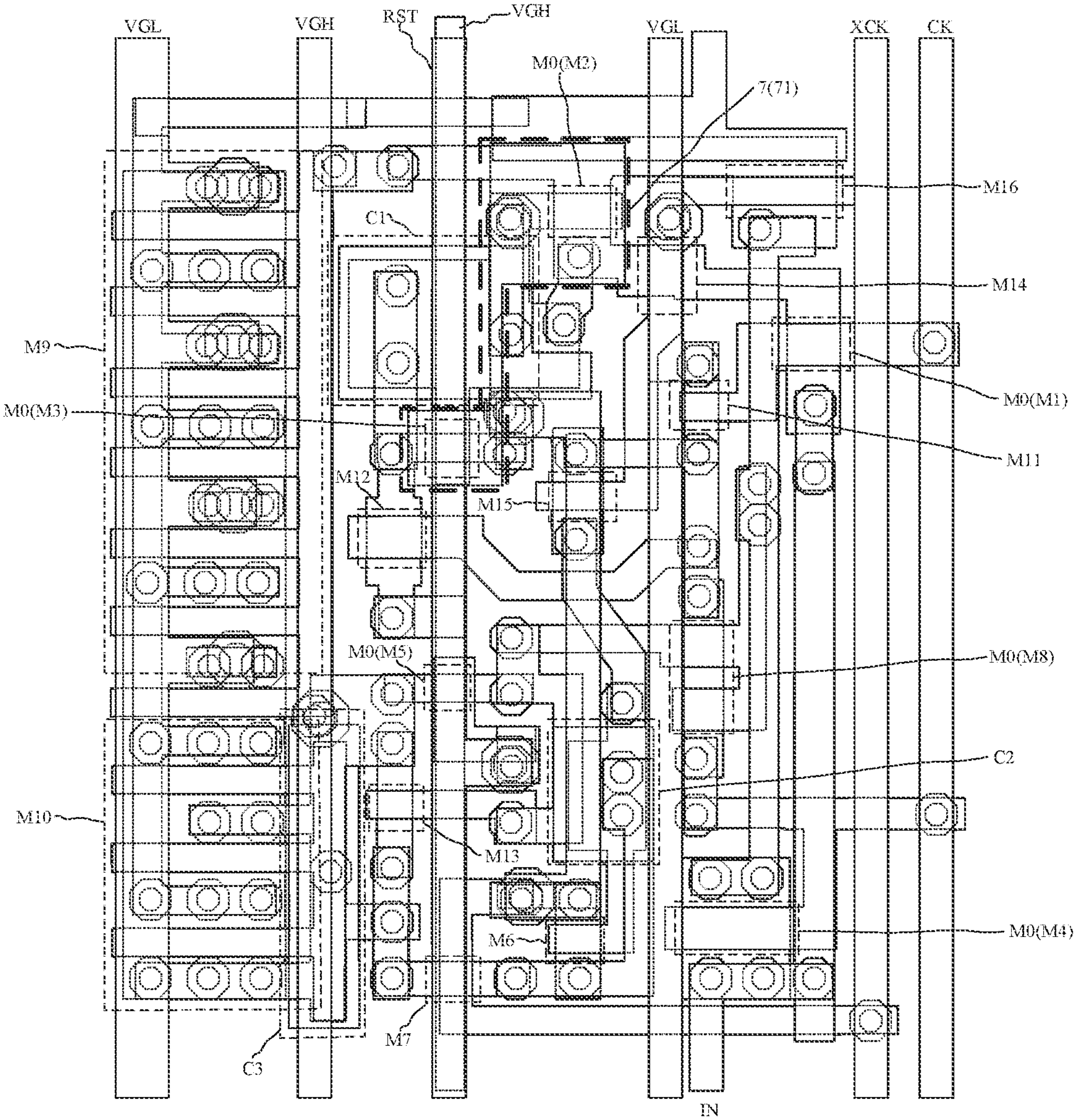
FIG. 6 is a schematic diagram illustrating another layer structure of a display panel provided by some embodiments of the present disclosure.

FIG. 6 is a schematic diagram illustrating another layer structure of a display panel provided by some embodiments of the present disclosure. In some embodiments, as shown in FIG. 6, in the direction perpendicular to the plane of the substrate 1, the first top light-shielding layer 71 overlaps with the channel of the third transistor M3.

In a conventional light-emitting shift circuit, a voltage stabilization capacitor is usually directly electrically connected to the first node N1 to stabilize the voltage of the first node N1. In the embodiments of the present disclosure, the first capacitor C1 is not directly connected to the first node N1, and the potential of the first node N1 is coupled to a lower level by using an overall structure formed by the third transistor M3 and the first capacitor C1 during the light-emitting phase, so that the light-emitting enable voltage (low level) transmitted by the first fixed-potential signal line VGL is transmitted through the first output module 5 with less loss, thereby outputting a lower low level to the light-emitting control signal line Emit.

In some embodiments, the gate electrode and the first electrode of the second transistor M2 is short-circuited, which is equivalent to a unidirectional-conducted diode. Due to the third transistor M3 and the first capacitor C1, the potential of the second node N2 will be coupled by the second clock signal. When the potential of the second node N2 is greater than the potential of the first node N1, the second transistor M2 is turned off, and change of the potential of the second node N2 will not affect the potential of the first node N1. When the potential of the second node N2 is smaller than the potential of the first node N1, the second transistor M2 is gradually turned on, the potential of the first node N1 tends to $VN1+|Vth|$, the second transistor M2 keeps the first node N1 at a relatively stable voltage during most time. However, compared with the traditional voltage stabilization capacitor, the voltage stabilization capability of the second transistor M2 is not so strong, so when the signal output by the light-emitting shift circuit jumps to a low level, the potential of the first node N1 will be coupled to a lower level, and the conduction degree of the first output module 5 increases. In this case, the potential output by the light-emitting shift circuit to the light-emitting control signal line Emit is lower, and the light-emitting brightness of the light-emitting element 10 is more stable. In some embodiments of the present disclosure, the channel of the third transistor M3 is shielded by the first top light-shielding layer 71, so that the element characteristics of the third transistor M3 are more stable. In this case, the potential of the second node N2 will change when the second clock signal jumps to a high level or a low level, thereby adjusting the conduction state of the second transistor M2.

Figure 7:
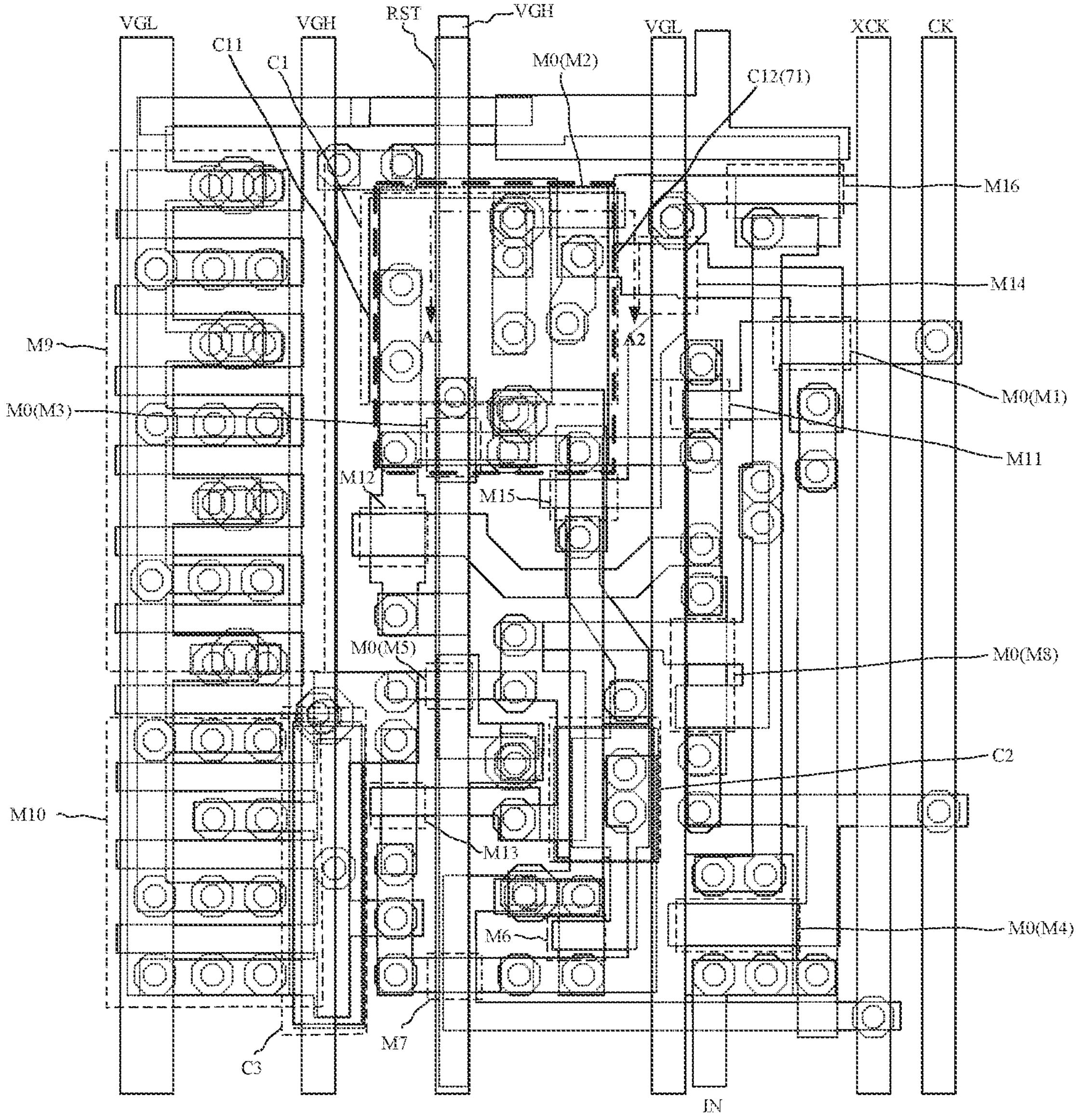
FIG. 7 is a schematic diagram illustrating another layer structure of a display panel provided by some embodiments of the present disclosure.
Figure 8:
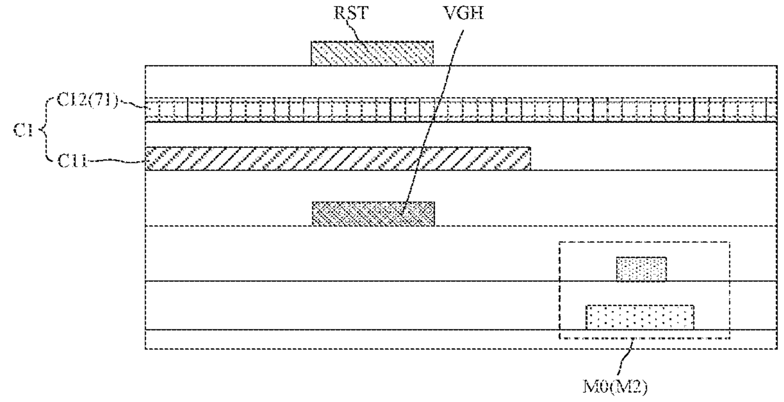
FIG. 8 is a cross-sectional view along A1-A2 shown in FIG. 7, in accordance with an embodiment of the present disclosure.

FIG. 7 is a schematic diagram illustrating another layer structure of a display panel provided by some embodiments of the present disclosure, and FIG. 8 is a cross-sectional view along A1-A2 shown in FIG. 7, In some embodiments, as shown in FIG. 7 and FIG. 8, the first top light-shielding layer 71 is reused as the first electrode plate C11 or the second electrode plate C12 of the first capacitor C1.

In combination with the circuit structure of the light-emitting shift circuit 3, it can be seen that the second transistor M2 and the first capacitor C1 are connected to each other. In the layout design of the circuit, the second transistor M2 is also relatively close to the first capacitor C1. In the embodiments of the present disclosure, the first top light-shielding layer 71 is used to shield external ambient light, and the first top light-shielding layer 71 is reused as the first electrode plate C11 or the second electrode plate C12 of the first capacitor C1, so that a horizontal space occupied by the first capacitor C1 at a side of a horizontal direction of the second transistor M2 can be reduced to optimize the layout design; or, without increasing the horizontal space occupied by the first capacitor C1 at the side of the horizontal direction of the second transistor M2, a directly-facing area between two electrode plates of the first capacitor C1 can be increased, and the design flexibility of the capacitance of the first capacitor C1 can be improved.

In some embodiments, the first top light-shielding layer 71 is electrically connected to the second electrode plate of the first capacitor C1. In the layout design of the circuit, the second transistor M2 is relatively close to the first capacitor C1, and correspondingly, the first top light-shielding layer 71 is also relatively close to the second electrode plate of the first capacitor C1. Therefore, the first top light-shielding layer 71 is electrically connected to the second electrode plate of the first capacitor C1, so that there is a voltage signal that transmits on the first top light-shielding layer 71 and a length of a connection wire electrically connected to the first top light-shielding layer 71 can be reduced.

In some embodiments, the first top light-shielding layer 71 can also be electrically connected to the second node N2. In the layout design of the circuit, the second transistor M2 is relatively close to the second node N2, and accordingly, the first top light-shielding layer 71 is relatively close to the second node N2, so the electrical connection between the first top light-shielding layer 71 and the second node N2 can optimize the layout design. When the first top light-shielding layer 71 is electrically connected to the second node N2, the potentials of the first top light-shielding layer 71 and the first electrode and the gate electrode of the second transistor M2 change synchronously, so that a jump of the potential of the first top light-shielding layer 71 has a reduced influence on the potentials of the first electrode and gate electrode of the second transistor M2.

In some embodiments, referring to FIG. 3 and FIG. 4, the control module 6 includes a second control module 62, the control transistor M0 of the second control module 62 includes a fourth transistor M4, a gate electrode of the fourth transistor M4 is electrically connected to the first clock signal line CK, a first electrode of the fourth transistor M4 is electrically connected to the shift control signal line IN, and a second electrode of the fourth transistor M4 is electrically connected to the first node N1.

It should be noted that the embodiments of the present disclosure illustrate the light-emitting shift circuit 3 with two structures as shown in FIG. 3 and FIG. 4. Compared with the light-emitting shift circuit 3 shown in FIG. 3, the light-emitting shift circuit 3 shown in FIG. 4 is provided with several normally-turned-on transistors, such as a fourteenth transistor M14, a fifteenth transistor M15, and a sixteenth transistor M16, which are used to stabilize the node voltage. Since the normally-turned-on transistors are continuously turned on, they can also be regarded as a connecting line in structure. In view of the above, in some embodiments of the present disclosure, the electrical connection between the second electrode of the fourth transistor M4 and the first node N1 can be understood as the direct connection between the second electrode of the fourth transistor M4 and the first node N1 in FIG. 3, and it can also be understood as the connection between the second electrode of the fourth transistor M4 and the first node N1 through the normally-turned-on sixteenth transistor M16 in FIG. 4.

Figure 9:
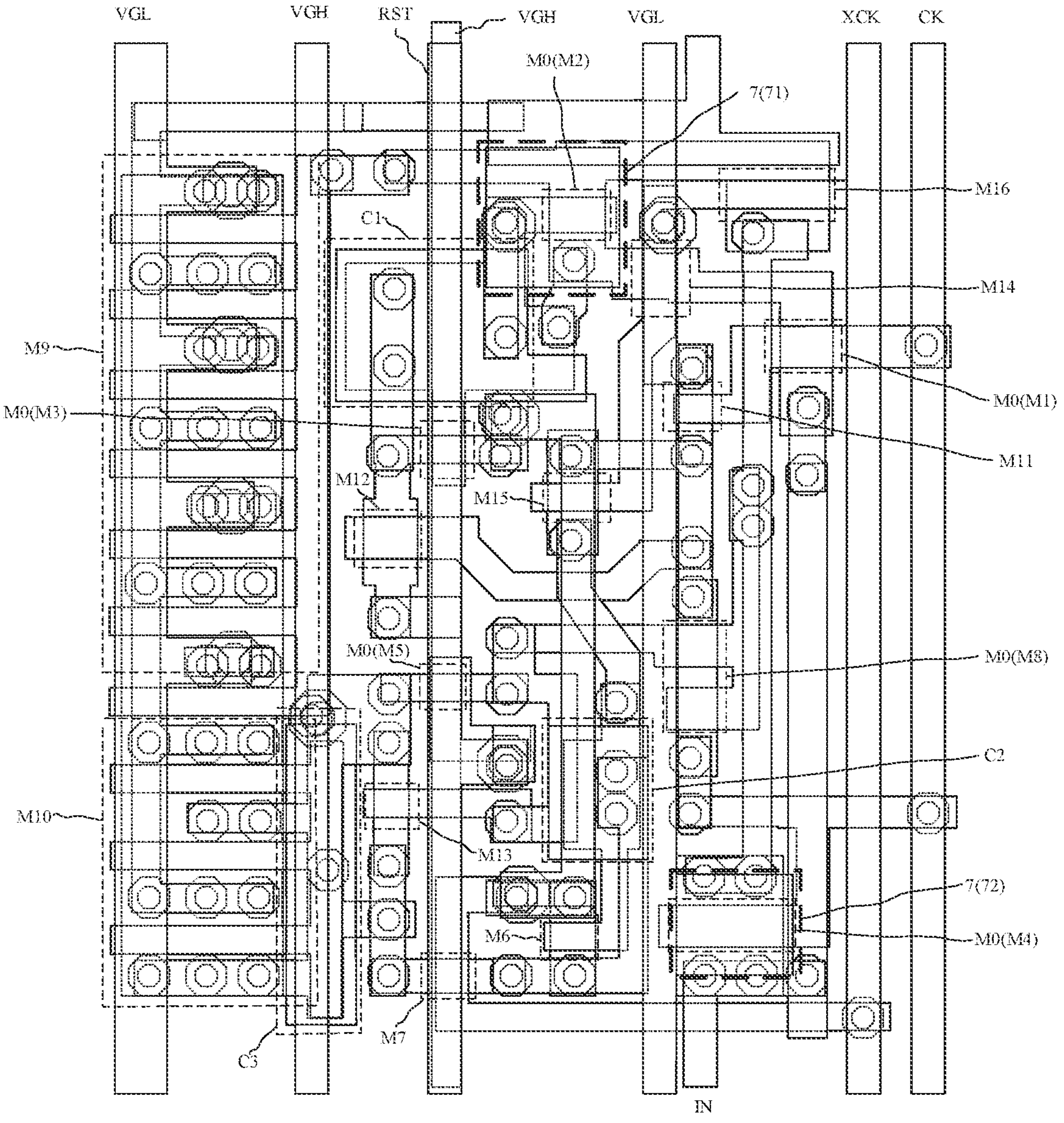
FIG. 9 is a schematic diagram illustrating another layer structure of a display panel provided by some embodiments of the present disclosure.

FIG. 9 is a schematic diagram illustrating another layer structure of a display panel provided by some embodiments of the present disclosure. In some embodiments, as shown in FIG. 9, the top light-shielding layer 7 includes a second top light-shielding layer 72, and the second top light-shielding layer 72 overlaps with a channel of the fourth transistor M4 in the direction perpendicular to the plane of the substrate 1.

When the shift control signal line IN provides a low level (light-emitting enable level) and the first clock signal line CK provides a low level, the fourth transistor M4 is turned on to transmit the low level provided by the shift control signal line IN to the first node N1, and then the first output module 5 is controlled to output the light-emitting enable voltage. It can be seen that the element characteristic of the fourth transistor M4 will directly affect the potential of the first node N1, thereby affecting the stability of the light-emitting enable voltage output by the first output module 5. In the embodiments of the present disclosure, the second top light-shielding layer 72 is provided to shield the channel of the fourth transistor M4, thereby reducing the effect of light on the threshold voltage of the fourth transistor M4. In this case, when the first clock signal line CK provides a low level, the fourth transistor M4 can be turned on to a greater extent, thereby ensuring that the potential of the first node N1 and the low level provided by the shift control signal line IN tend to be consistent.

It should be noted that referring to FIG. 9, in the layout design of the light-emitting shift circuit 3, the fourth transistor M4 is relatively close to a first fixed voltage signal line VGL. In some embodiments of the present disclosure, the second top light-shielding layer 72 and the first fixed voltage signal line VGL can be disposed in a same layer and communicated with each other, so that the light-emitting enable voltage (low level) provided by the first fixed voltage signal line VGL is transmitted on the second top light-shielding layer 72.

In some embodiments, referring to FIG. 3 and FIG. 4, the control module 6 includes a third control module 63, the control transistor M0 of the third control module 63 includes a fifth transistor M5. A gate electrode of the fifth transistor M5 is electrically connected to a first control signal line RST, a first electrode of the fifth transistor 115 is electrically connected to a second fixed potential signal line, and a second electrode of the fifth transistor M5 is electrically connected to the first node N1.

Figure 10:
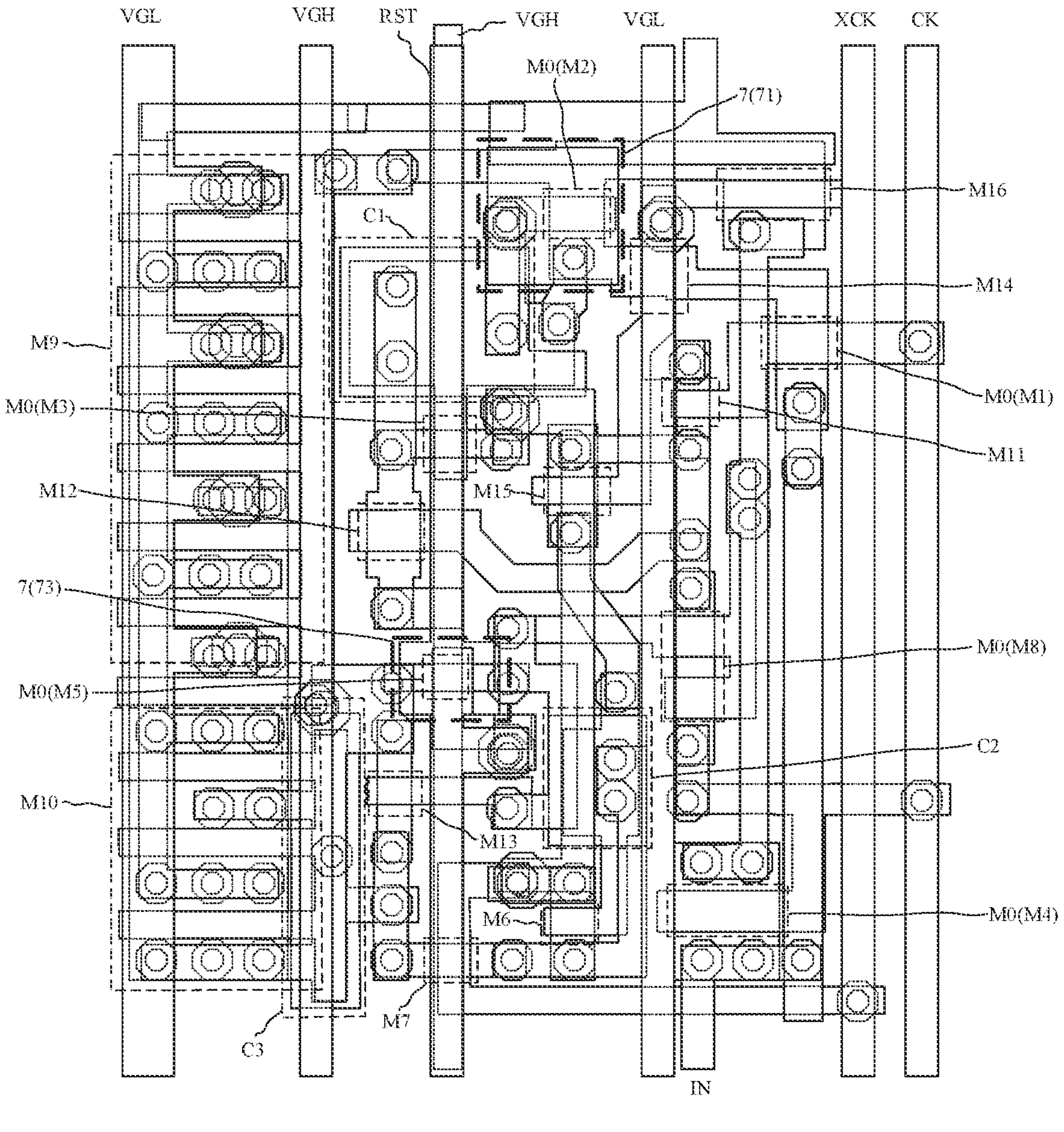
FIG. 10 is a schematic diagram illustrating another layer structure of a display panel provided by some embodiments of the present disclosure.

FIG. 10 is a schematic diagram illustrating another layer structure of a display panel provided by some embodiments of the present disclosure. In some embodiments, as shown in FIG. 10, the top light-shielding layer 7 includes a third top light-shielding layer 73 overlapping with a channel of the fifth transistor 5 in a direction perpendicular to the plane of the substrate 1.

In the light-emitting shift circuit 3, the fifth transistor M5 is a transistor for preventing abnormal power-off. In general, the first control signal line RST continuously provides a high level, the fifth transistor M5 remains turned-off, and the high level of the second fixed potential signal line charges the parasitic capacitance of the fifth transistor M5. When the power is off abnormally, the fifth transistor M5 can transmit its stored voltage to the first node N1 to make the first output module 5 not output a light-emitting enable level, thereby preventing the light-emitting element 10 from emitting abnormally. The third top light-shielding layer 73 shields a channel of the fifth transistor M5 to prevent the threshold value of the fifth transistor M5 from being forward biased, thereby achieving the stability of the working state of the fifth transistor M5 and enabling the fifth transistor M5 to provide a more reliable anti-power failure function in the light-emitting shift circuit 3.

It should be noted that referring to FIG. 10, in the layout design of the light-emitting shift circuit 3, the fifth transistor M5 is relatively close to the first control signal line RST. In some embodiments of the present disclosure, the third top light-shielding layer 73 and the first control signal line RST are disposed in a same layer and communicated with each other, so that a high level provided by the first control signal line RST is transmitted on the third top light-shielding layer 73.

In some embodiments, referring to FIG. 3 and FIG. 4, the light-emitting shift circuit 3 includes a first driving module 8, and the first driving module 8 includes a sixth transistor M6, a seventh transistor M7, and a second capacitor C2. A gate electrode of the sixth transistor M6 and a first plate of the second capacitor C2 are electrically connected to a fourth node N4, a first electrode of the sixth transistor M6 is electrically connected to a second clock signal line XCK, and a second electrode of the sixth transistor M6 is electrically connected to a second electrode plate of the second capacitor C2. A gate electrode of the seventh transistor M7 is electrically connected to the second clock signal line XCK, a first electrode of the seventh transistor M7 is electrically connected to the second electrode of the sixth transistor M6, and a second electrode of the seventh transistor M7 is electrically connected to a third node N3.

As mentioned above, the fifteenth transistor MI5 shown in FIG. 4 is a normally-turned-on transistor, which can be regarded as a connecting line in structure. Therefore, in the embodiments of the present disclosure, the gate electrode of the sixth transistor M6 and the first electrode plate of the second capacitor C2 being electrically connected to the fourth node N4 can be understood as follows: the gate electrode of the sixth transistor M6 and the first electrode plate of the second capacitor C2 are directly connected to the fourth node N4 in FIG. 3, or the gate electrode of the sixth transistor M6 and the first plate of the second capacitor C2 are connected to the fourth node N4 through the fifteenth transistor M15 in FIG. 4.

The control module 6 includes a fourth control module 64, the control transistor M0 of the fourth control module 64 includes an eighth transistor M8, a gate electrode of the eighth transistor M8 is electrically connected to the first node N1, a first electrode of the eighth transistor 1118 is electrically connected to the first clock signal line CK, and a second electrode of the eighth transistor M8 is electrically connected to the fourth node N4.

Figure 11:
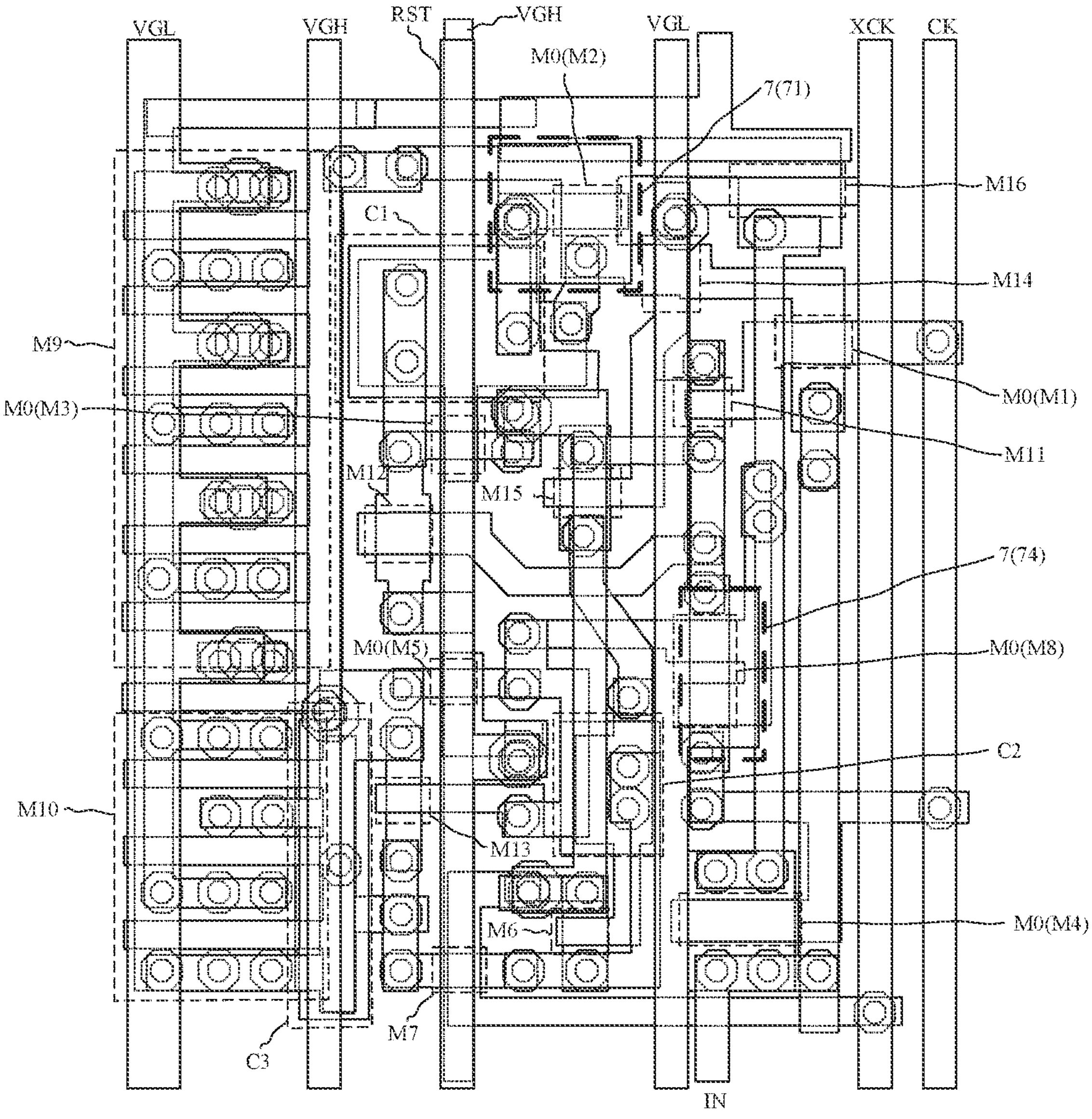
FIG. 11 is a schematic diagram illustrating another layer structure provided by some embodiments of the present disclosure.

FIG. 11 is a schematic diagram illustrating another layer structure provided by some embodiments of the present disclosure. In some embodiments, as shown in FIG. 11, the top light-shielding layer 7 includes a fourth top light-shielding layer 74 overlapping with a channel of the eighth transistor M8 in the direction perpendicular to the plane of the substrate 1.

In order to reduce leakage current, the eighth transistor M8 in the light-emitting shift circuit 3 can be configured as a double-gate transistor. Since the double-gate transistor has a relatively large channel length, the double-gate transistor is more affected by light. In the embodiments of the present disclosure, the fourth top light-shielding layer 74 shields the channel of the eighth transistor M8, thereby improving the stability of the conduction state of the eighth transistor M8, and thus improving the stability of the potential of the fourth node N4. In this case, stability of the potential output by the first driving module 8 can be achieved when the voltage of the fourth node N4 drives the first driving module 8.

Referring to FIG. 11, in the layout design of the light-emitting shift circuit 3, the eighth transistor M8 is relatively close to the first fixed voltage signal line VGL. In some embodiments of the present disclosure, the fourth top light-shielding layer 74 and the first fixed-voltage signal line VGL are disposed in a same layer and communicated with each other, so that the light-emitting enable voltage (low level) provided by the first fixed-voltage signal line VGL can be transmitted on the fourth top light-shielding layer 74.

In some embodiments, the top light-shielding layer 7 receives a constant voltage signal. In this case, a stable potential is continuously transmitted on the top light-shielding layer 7, thereby preventing the potential jump coupling on the top light-shielding layer 7 from affecting the node potential of the light-emitting shift circuit 3.

For example, as shown in FIG. 9 and FIG. 11, the second top light-shielding layer 72 and the fourth top light-shielding layer 74 each are communicated with the first fixed voltage signal line VGL, and the second top light-shielding layer 72 and the fourth top light-shielding layer 74 each receive a constant low level.

In some embodiments, the top light-shielding layer 7 is electrically connected to the first node N1. In the layout design of the circuit, the control transistor M0 that is electrically connected to the first node N1 is relatively close to the first node N1. When the top light-shielding layer 7 shields the channel of the control transistor M0, the top light-shielding layer 7 is also relatively close to the first node N1, so the electrical connection between the top light-shielding layer 7 and the first node N1 can optimize the layout design. Moreover, when the top light-shielding layer 7 is electrically connected to the first node N1, the top light-shielding layer 7 changes synchronously with the potential of the first electrode or the potential of the second electrode of at least one control transistor M0, for example, the first top light-shielding layer 71 is electrically connected to the first node N1, thereby reducing an influence of the potential jump on the first top light-shielding layer 71 on the potential on the second electrode of the second transistor M2.

Figure 12:
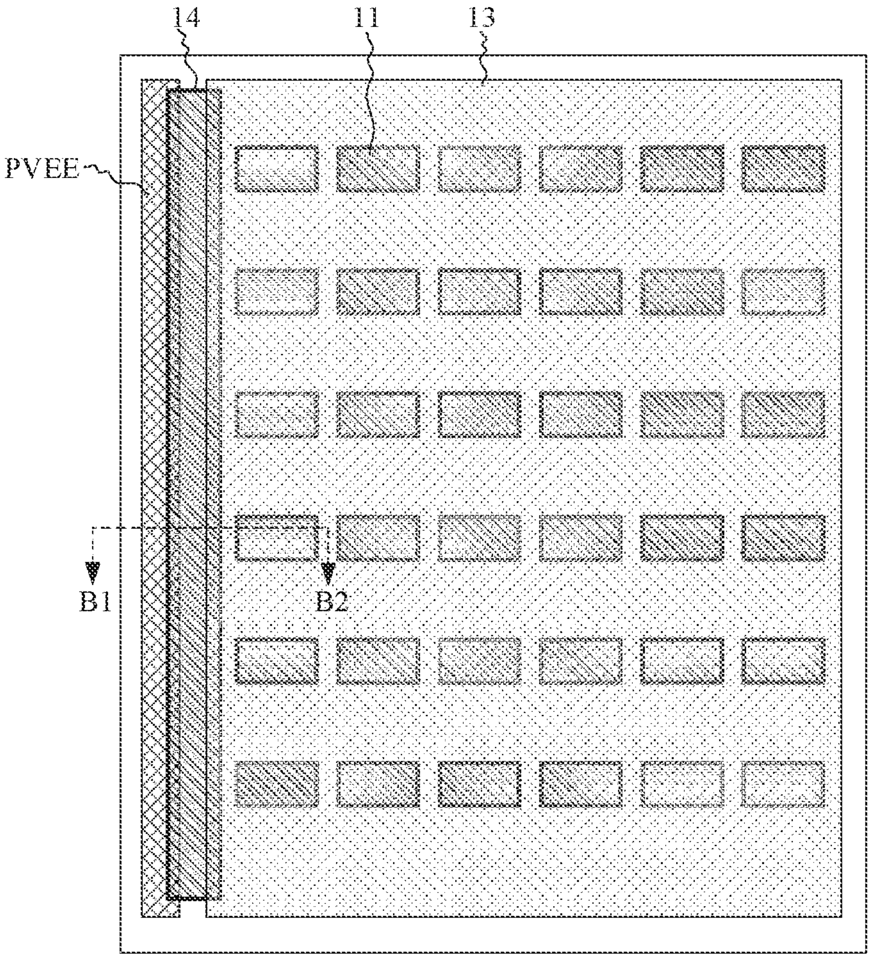
FIG. 12 is another top view of a display panel provided by some embodiments of the present disclosure.
Figure 13:
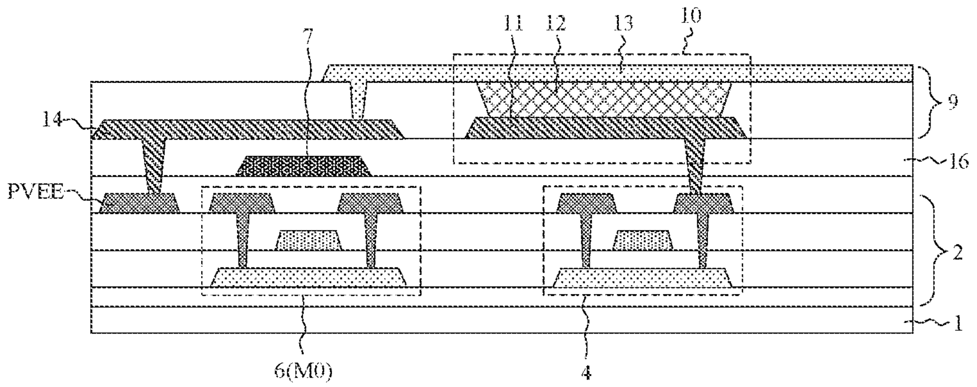
FIG. 13 is a cross-sectional view along B1-B2 shown in FIG. 12, in accordance with an embodiment of the present disclosure.

FIG. 12 is another top view of a display panel provided by some embodiments of the present disclosure, and FIG. 13 is a cross-sectional view along B1-B2 shown in FIG. 12. In some embodiments, as shown in FIG. 12 and FIG. 13, the display panel includes a light-emitting element layer 9 located at a side of the circuit layer 2 facing away from the substrate 1, and the light-emitting element layer 9 includes multiple light-emitting elements 10. The light-emitting element 10 includes an anode 11, a light-emitting layer 12 located at a side of the anode 11 facing away from the substrate 1, and a cathode 13 located at a side of the light-emitting layer 12 facing away from the substrate 1. The cathode 13 is electrically connected to a negative power bus PVEE through an auxiliary connection part 14, and the top light-shielding layer 7 is located between the control transistor M0 and the auxiliary connection part 14.

If the top light-shielding layer 7 is arranged in the same layer as the first electrode and the second electrode of the control transistor M0, due to limitation of the layout space, a horizontal gap between a top metal layer and the first electrode and the second electrode of the control transistor M0 will be very small. In this case, a great interference occurs when the external ambient light is incident through the gap between the top metal layer and the first electrode and the second electrode of the control transistor M0. For example, for the display panel with a camera function and a fingerprint recognition function, when the top light-shielding layer 7 is located in the optical component arrangement area, the interference caused between the top light-shielding layer 7 and other metal wires will greatly affect the imaging quality and fingerprint recognition accuracy. However, in the embodiments of the present disclosure, by disposing the top light-shielding layer 7 between the control transistor M0 and the auxiliary connection part 14, the top light-shielding layer 7 will not be disposed in a same layer as the metal wires used to form the transistors in the light-emitting shift circuit 3, therefore, the interference phenomenon between metals in the same layer can be alleviated.

Figure 14:
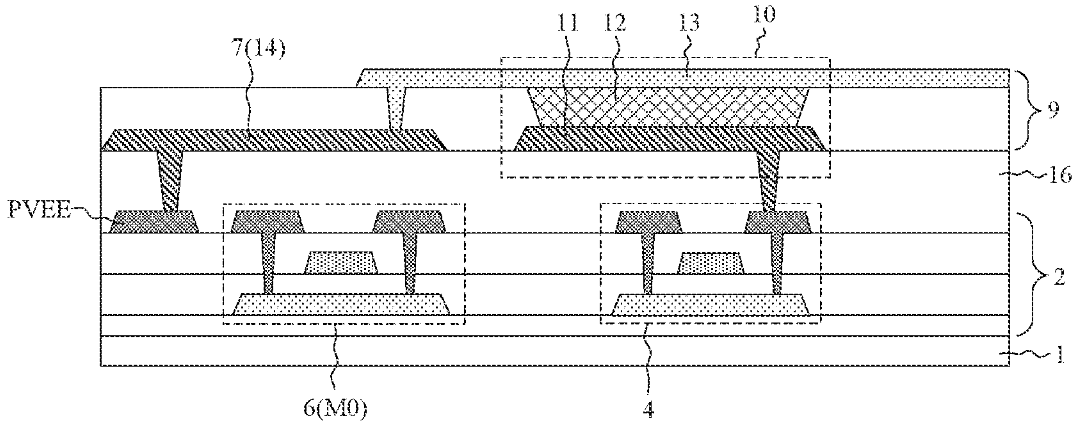
FIG. 14 is another cross-sectional view along B1-B2 shown in FIG. 12, in accordance with an embodiment of the present disclosure.

FIG. 14 is another cross-sectional view along B1-B2 shown in FIG. 12. In some embodiments, as shown in FIG. 14, the display panel includes a light-emitting element layer 9 located at a side of the circuit layer 2 facing away from the substrate 1, and the light-emitting element layer 9 includes multiple light-emitting elements 10. The light-emitting element 10 include an anode 11, a light-emitting layer 12 located at a side of the anode 11 facing away from the substrate 1, and a cathode 13 located at a side of the light-emitting layer 12 facing away from the substrate 1. The top light-shielding layer 7 and the anode 11 are disposed in a same layer. In this case, the top light-shielding layer 7 and the anode 11 can be formed by a same patterning process, thereby saving the process flow.

In some embodiments, referring to FIG. 12 and FIG. 14, the cathode 13 is electrically connected to a negative power bus PVEE through the auxiliary connection part 14, and the top light-shielding layer 7 is reused as the auxiliary connection part 14.

In some embodiments, the display panel has a display region and a non-display region, and the light-emitting shift circuit 3, the negative power bus PVEE, and the auxiliary connection part 14 are all arranged in the non-display region. When the top light-shielding layer 7 is reused as the auxiliary connection part 14, at least a part of the light-emitting shift circuit 3 overlaps with the auxiliary connection part 14. In this case, a horizontal width of an area occupied by the light-emitting shift circuit 3 and the auxiliary connection part 14 in the non-display region can be reduced, thereby reducing a border width of the non-display region. Moreover, due to a relatively large width of the auxiliary connecting portion 14, the channel of the control transistor M0 can be shielded to a greater extent.

Figure 15:
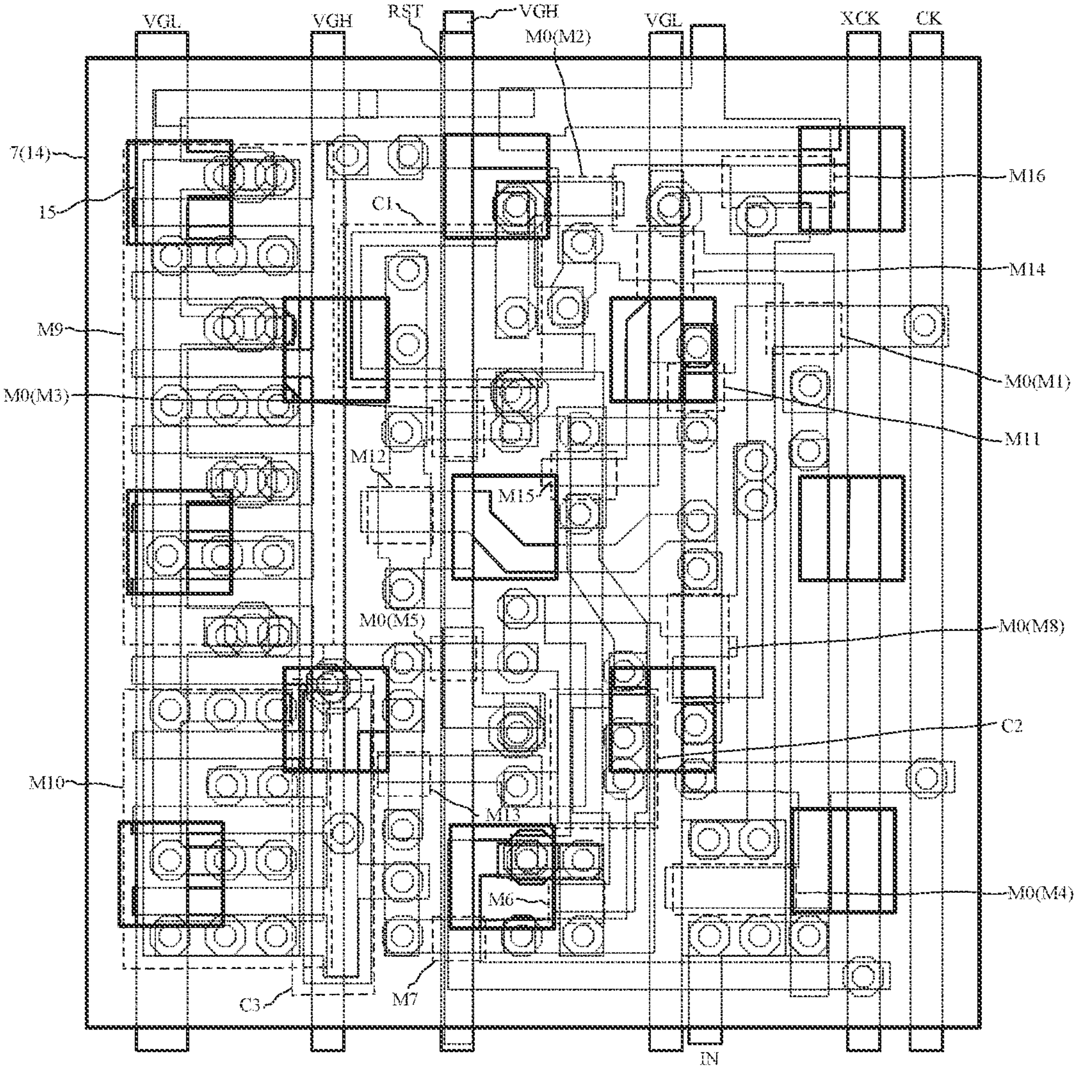
FIG. 15 is a schematic diagram illustrating another layer structure of a display panel provided by some embodiments of the present disclosure.
Figure 16:
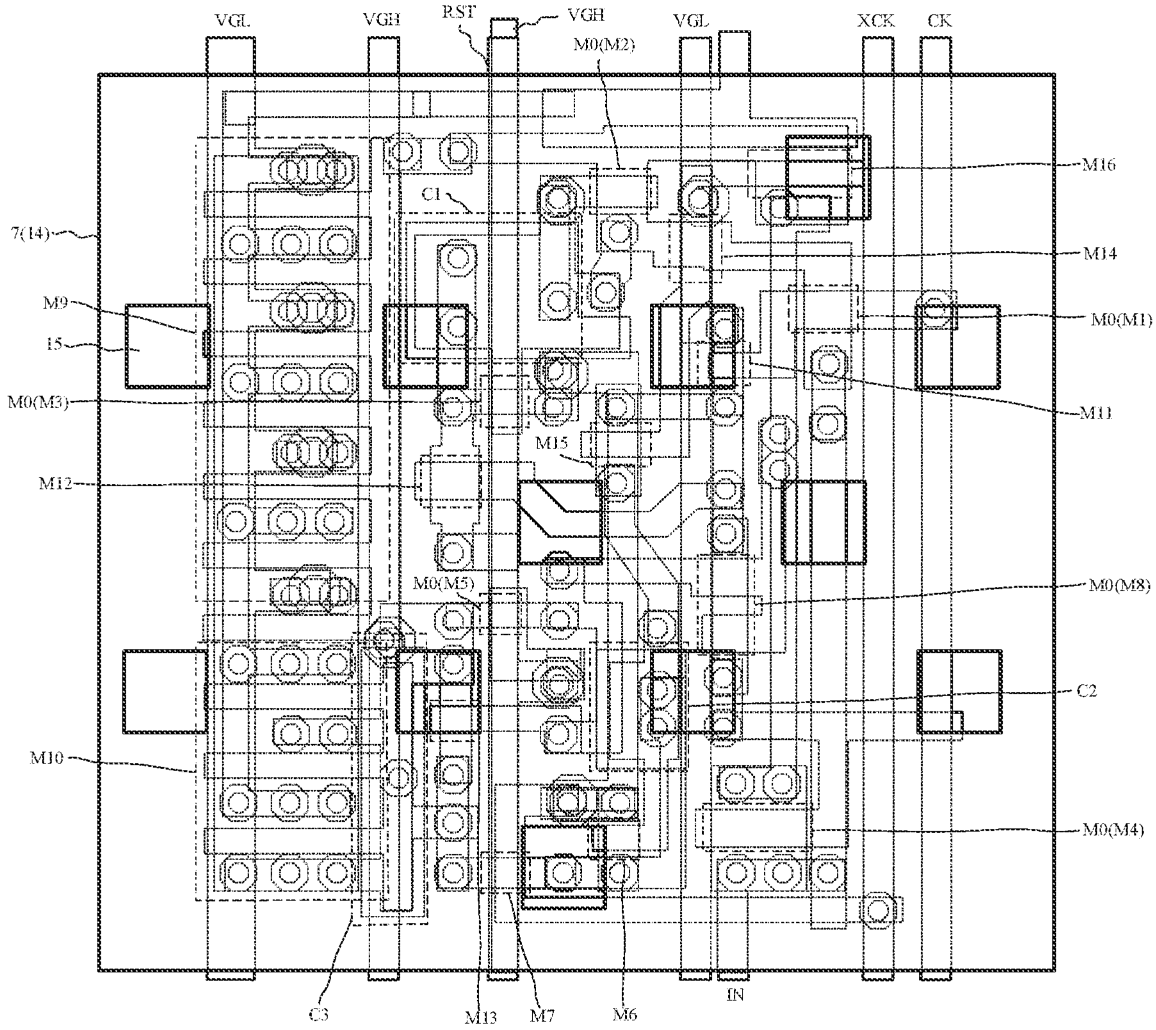
FIG. 16 is a schematic diagram illustrating another layer structure of a display panel provided by some embodiments of the present disclosure.

FIG. 15 is a schematic diagram illustrating another layer structure of a display panel provided by some embodiments of the present disclosure, and FIG. 16 is a schematic diagram illustrating another layer structure of a display panel provided by some embodiments of the present disclosure. In some embodiments, as shown in FIG. 15 and FIG. 16, the top light-shielding layer 7 includes multiple openings 15. In the direction perpendicular to the plane of the substrate 1, the openings 15 do not overlap with the channel of the control transistor M0, that is, positions of the openings 15 formed in the top light-shielding layer 7 avoid the channel of the control transistor M0.

Referring to FIG. 14, a planarization layer 16 made of an organic material is usually provided below the top light-shielding layer 7. During the manufacturing process of the display panel, the planarization layer 16 decomposes water vapor or absorbs part of the water vapor, and the water vapor is released when subsequently forming other layers on the planarization layer 16, causing the layer on the planarization layer 16 to bulge, thereby resulting in layer detachment. In the embodiments of the present disclosure, multiple openings 15 in the top light-shielding layer 7 can be used to realize the exhaust effect, so that the water vapor in the planarization layer 16 can be effectively released, thereby preventing the water vapor from remaining in the planarization layer 16 and to cause problems such as layer deformation. Moreover, the openings 15 do not overlap with the channel of the control transistor M0, so that the top light-shielding layer 7 can cover the channel of the control transistor M0, thereby shielding the channel of the control transistor M0 to a greater extend.

In some embodiments, referring to FIG. 3 and FIG. 4, the first output module 5 includes a ninth transistor M9, a gate electrode of the ninth transistor M9 is electrically connected to the first node N1, a first electrode of the ninth transistor M0 is electrically connected to the first fixed potential signal line VGL, and a second electrode of the ninth transistor M9 is electrically connected to the light-emitting control signal line Emit.

Figure 17:
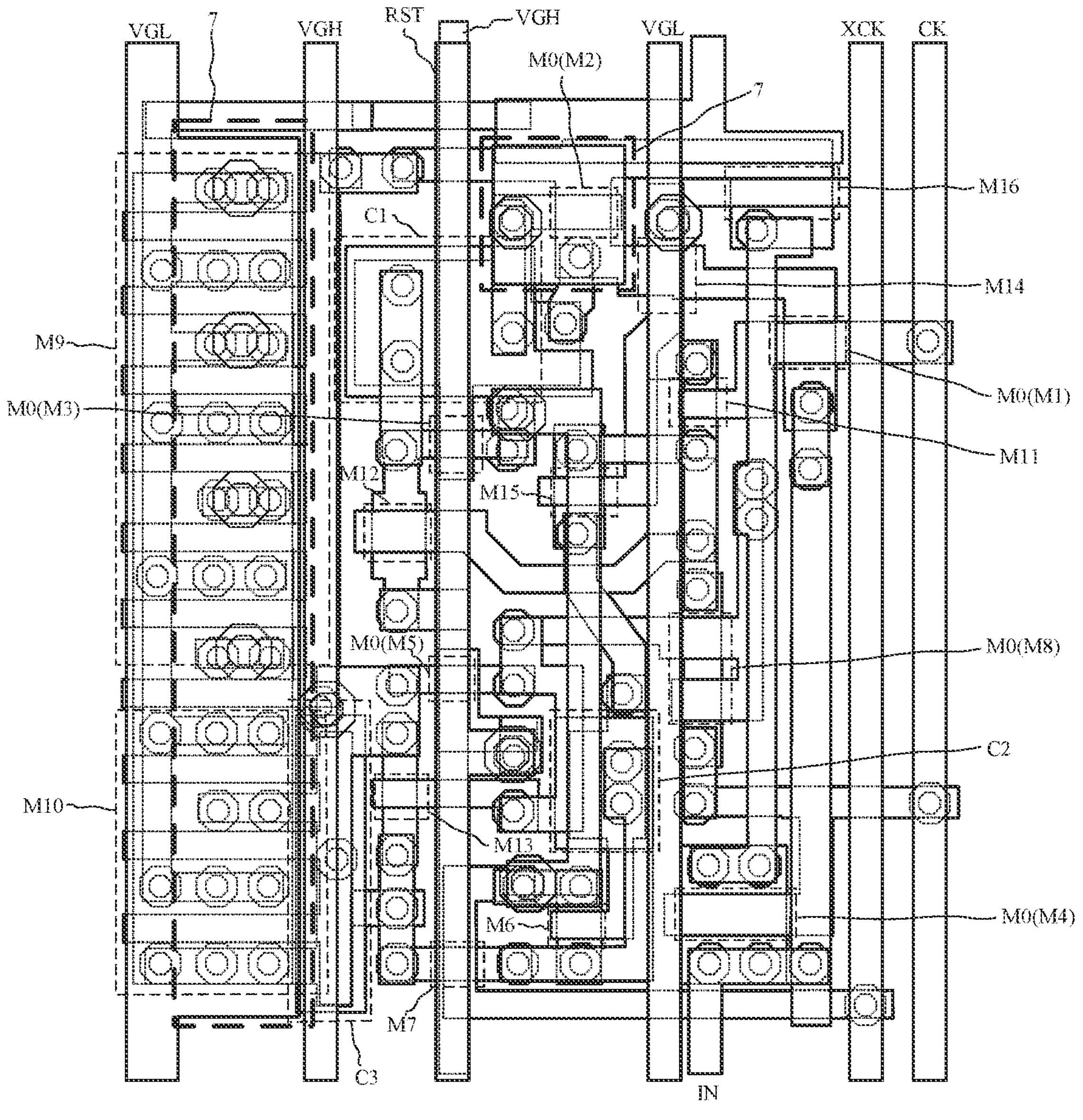
FIG. 17 is a schematic diagram illustrating another layer structure of a display panel provided by some embodiments of the present disclosure.

FIG. 17 is a schematic diagram illustrating another layer structure of a display panel provided by some embodiments of the present disclosure. In some embodiments, as shown in FIG. 17, in the direction perpendicular to the plane of the substrate 1, the top light-shielding layer 7 overlaps with a channel of the ninth transistor M9.

If the threshold voltage of the ninth transistor M9 drifts, the conduction degree of the ninth transistor M9 will be affected, as a result, the voltage transmitted from the light-emitting shift circuit 3 to the light-emitting control signal line Emit cannot reach the light-emitting enable voltage provided by the first fixed-potential signal line VGL, thereby affecting the light-emitting accuracy of the light-emitting element 10. By using the top light-shielding layer 7 to shield the channel of the ninth transistor M9, an influence of light on the threshold voltage of the ninth transistor M9 can be reduced, thereby preventing the threshold of the ninth transistor M9 from drifting.

In some embodiments, referring to FIG. 3 and FIG. 4, the light-emitting shift circuit includes a second output module 17, the second output module 17 includes a tenth transistor M10, a gate electrode of the tenth transistor M10 is electrically connected to the third node N3, a first electrode of the tenth transistor M10 is electrically connected to the second fixed potential signal line, and a second electrode of the tenth transistor M10 is electrically connected to the light-emitting control signal line Emit.

Referring to FIG. 17, in the direction perpendicular to the plane of the substrate 1, the top light-shielding layer 7 also overlaps with a channel of the tenth transistor M10.

The tenth transistor M10 is configured to transmit a light-emitting disable voltage provided by the second fixed potential signal line to the light-emitting control signal line Emit. If the threshold voltage of the tenth transistor M10 drifts when affected by light, the conduction degree of the tenth transistor M10 will be reduced or the tenth transistor M10 has a poor turn-off state, thereby affecting the stability of the output potential of the tenth transistor M10. For example, when the light-emitting shift circuit 3 needs to transmit a light-emitting enable voltage to the light-emitting control signal line Emit, if the tenth transistor M10 has a poor turn-off state, the second fixed-potential signal line will leak electricity to the light-emitting control signal line Emit through the tenth transistor M10, as a result, the light-emitting shift circuit 3 will fail to output a stable low level. Therefore, in the embodiments of the present disclosure, by using the top light-shielding layer 7 to shield the channel of the tenth transistor M10, tan influence of light on the threshold voltage of the tenth transistor M10 can be reduced, thereby preventing the threshold value from shifting, and thus improving the reliability of the working state of the transistor M10.

Figure 18:
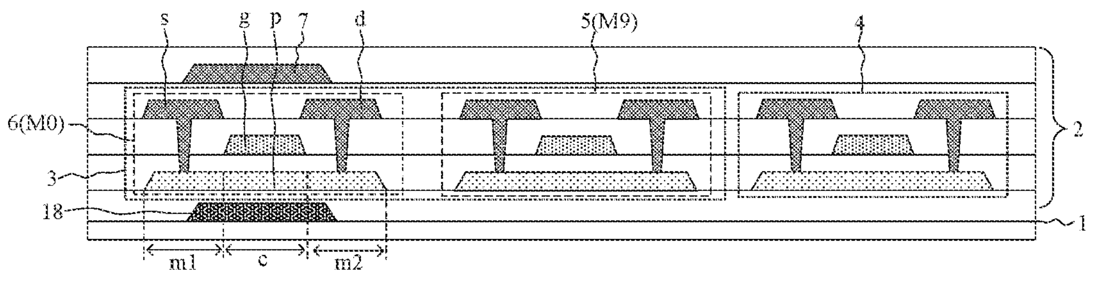
FIG. 18 is another partial cross-sectional view of a display panel provided by some embodiments of the present disclosure.

Referring to FIG. 18, in the layout design of the light-emitting shift circuit 3, the ninth transistor M9 and the tenth transistor M10 are relatively close to one first fixed voltage signal line VGL, and are also relatively close to one second fixed potential signal line VGH. In some embodiments of the present disclosure, this part of the top light-shielding layer 7 that shields the channel of the ninth transistor M9 and the channel of the tenth transistor M10 can be arranged in the same layer as and communicated with the first fixed voltage signal line VGL or the second fixed potential signal line VGH, so that a low level or a high level is transmitted on this part of the top light-shielding layer 7.

Figure 19:
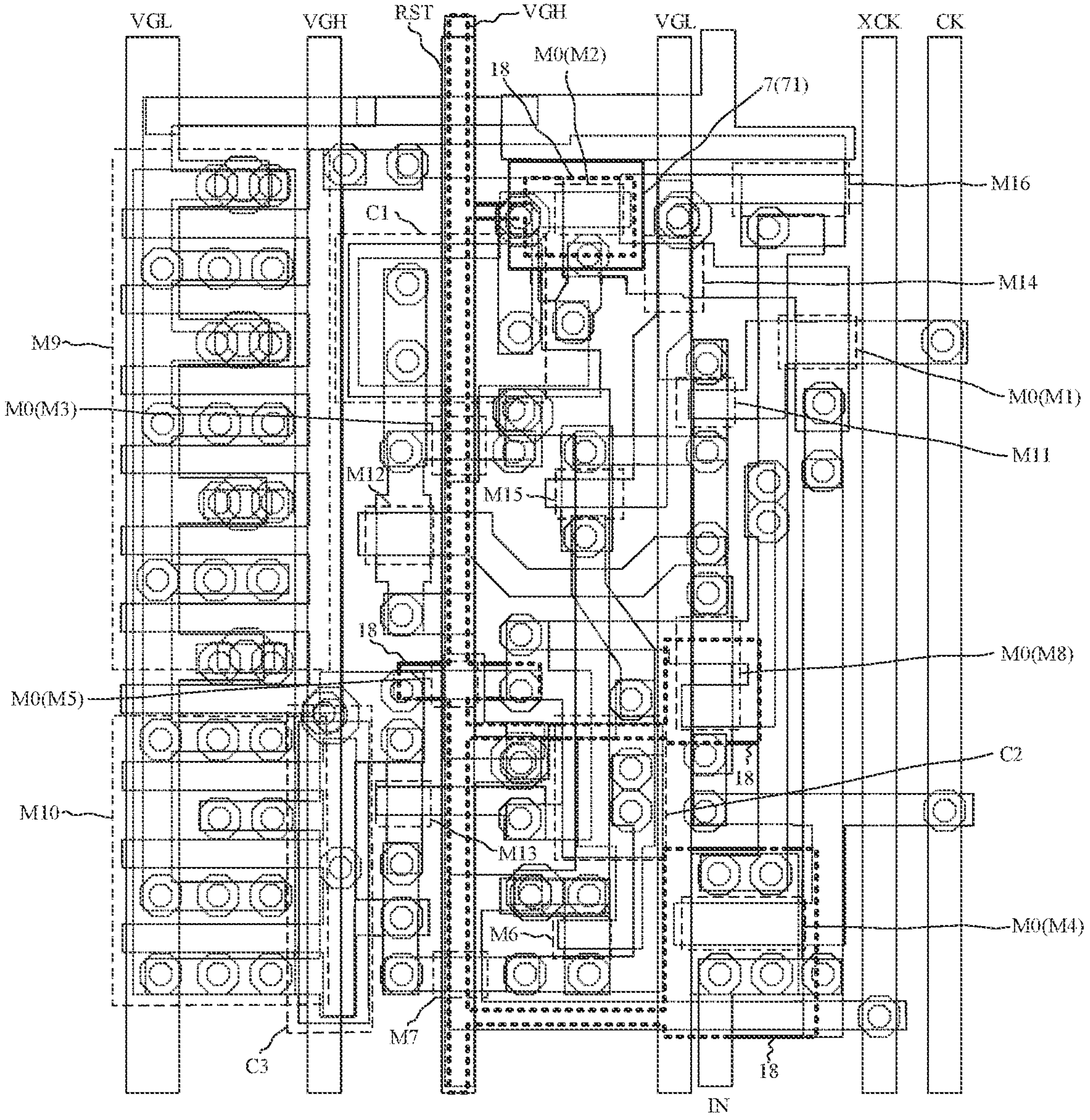
FIG. 19 is a schematic diagram illustrating another layer structure of a display panel provided by some embodiments of the present disclosure.

FIG. 18 is another partial cross-sectional view of a display panel provided by some embodiments of the present disclosure, and FIG. 19 is a schematic diagram illustrating another layer structure of a display panel provided by some embodiments. In some embodiments, as shown in FIG. 18 and FIG. 19, the display panel includes a bottom light-shielding layer 18, the bottom light-shielding layer 18 is located at a side of the control transistor M0 facing towards the substrate 1, and in the direction perpendicular to the plane of the substrate 1, the bottom light-shielding layer 18 overlaps with a channel of at least one control transistor M0. In this way, the bottom light-shielding layer 18 shields the ambient light incident through the bottom of the display panel, thereby preventing the external ambient light from affecting the threshold voltage of the control transistor M0.

In some embodiments, referring to FIG. 3 and FIG. 4, the first output module 5 includes a ninth transistor M9, a gate electrode of the ninth transistor M9 is electrically connected to the first node N1, a first electrode of the ninth transistor M9 is electrically connected to the first fixed potential signal line VGL, and a second electrode of the ninth transistor M9 is electrically connected to the light-emitting control signal line Emit.

The light-emitting shift circuit 3 includes a second output module 17, the second output module 17 includes a tenth transistor M10, a gate electrode of the tenth transistor M10 is electrically connected to the third node N3, a first electrode of the tenth transistor M10 is connected to the second fixed potential signal line, and a second electrode of the tenth transistor M10 is electrically connected to the light emission control signal line Emit.

Figure 20:
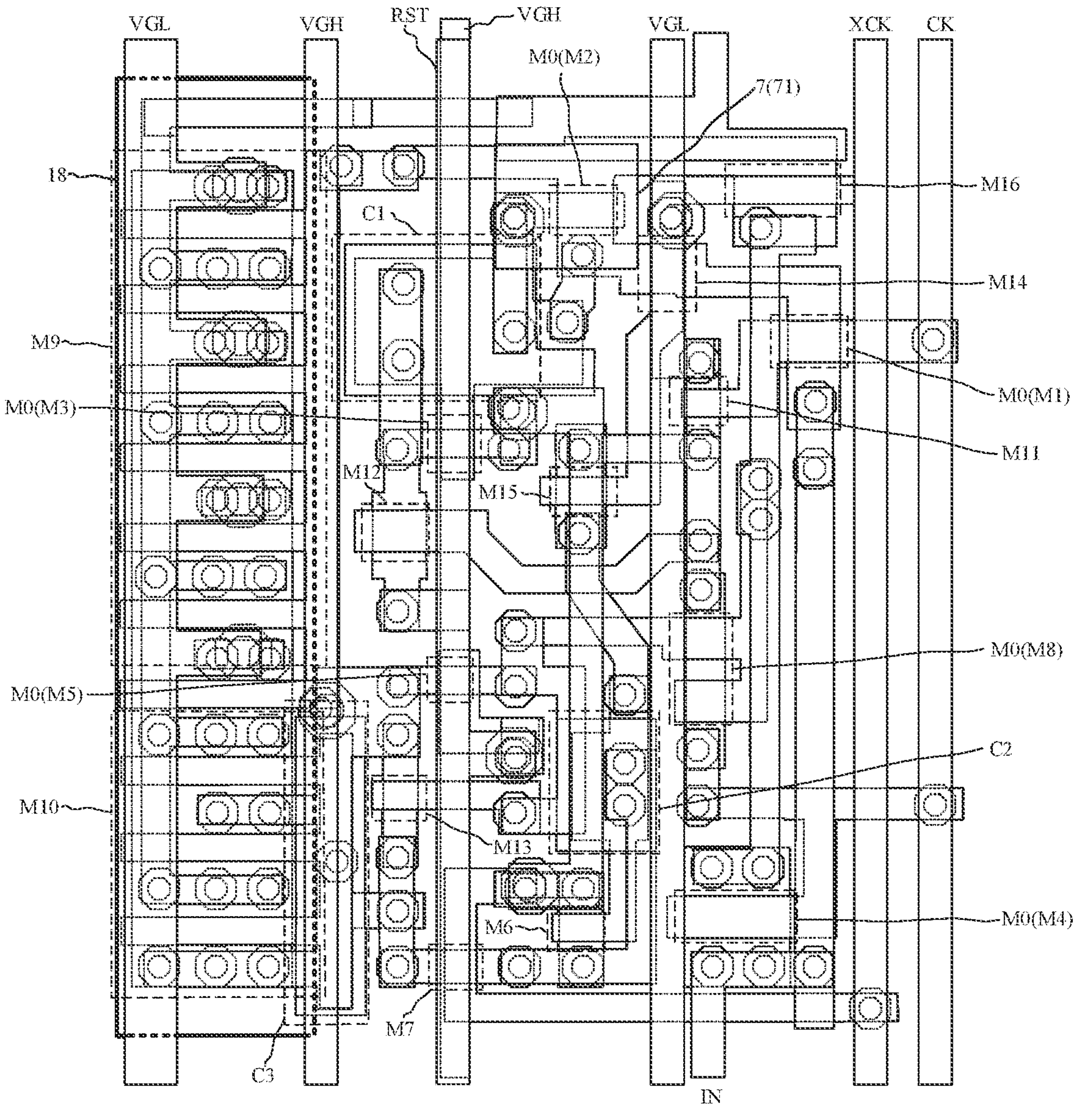
FIG. 20 is another partial cross-sectional view of a display panel provided by some embodiments of the present disclosure.

FIG. 20 is another partial cross-sectional view of a display panel provided by some embodiments of the present disclosure. In some embodiments, as shown in FIG. 20, in the direction perpendicular to the plane of the substrate 1, the bottom light-shielding layer 18 at least overlaps with the channel of the ninth transistor M9 and/or the channel of the tenth transistor M10.

For the two output transistors, that is, the ninth transistor M9 and the tenth transistor M10, the threshold voltages of the two output transistors directly affect the conduction degrees of the two transistors when they are turned on, which in turn affects the stability of the low level or the high-level output by the light-emitting shift circuit 3. In combination with the layer structure of the circuit, it can be seen that the ninth transistor M9 and the tenth transistor M10 have relatively large areas, which are much larger than areas of other control transistors. In view of the above, by arranging the bottom light-shielding layer 18 under the ninth transistor M9 and the tenth transistor M10, the bottom light-shielding layer 18 is relatively far away from the other metal wires in the circuit layer 2 while utilizing the bottom light-shielding layer 18 to reduce the influence of the external ambient light on the element characteristics of the two output transistors, so the coupling between the bottom light-shielding layer 18 and other signal lines is also small. In this case, even if the bottom light-shielding layer 18 has a larger area, the parasitic capacitance will not be greatly affected.

In some embodiments, the bottom light-shielding layer 18 receives a power voltage or a ground voltage.

In addition to being affected by light, the threshold voltage of the transistor is also affected by the friction of the copper rod. The friction of the copper rod makes the substrate 1 accumulate negative charges, and the channel carriers of the transistor are increased, thereby causing the transfer characteristic curve of the transistor to shift and the threshold voltage to be forward biased. By setting the bottom light-shielding layer 18 as a metal light-shielding layer and making it receive the power supply voltage or the ground voltage, the bottom light-shielding layer 18 can also be used to shield an influence of the triboelectric charge on the channel of the control transistor M0, thereby avoiding that the threshold voltage of the control transistor M0 is forward biased.

In some embodiments, referring to FIG. 3 and FIG. 4, the light-emitting shift circuit can include an eleventh transistor M11, a twelfth transistor M12, and a thirteenth transistor M13.

A gate electrode of the eleventh transistor M11 is electrically connected to the first clock signal line CK, a first electrode of the eleventh transistor M11 is electrically connected to the first fixed potential signal line VGL, and a second electrode of the eleventh transistor M11 is electrically connected to the second electrode of the eighth transistor M8. A gate electrode of the twelfth transistor M12 is electrically connected to the second electrode of the eleventh transistor M11, a first electrode of the twelfth transistor M12 is electrically connected to the second fixed potential signal line, and a second electrode of the twelfth transistor M12 is electrically connected to the second electrode of the third transistor M3. A gate electrode of the thirteenth transistor M13 is connected to the first node N1, a first electrode of the thirteenth transistor M13 is electrically connected to the second fixed potential signal line, and a second electrode of the thirteenth transistor M13 is electrically connected to the third node N3.

Figure 21:
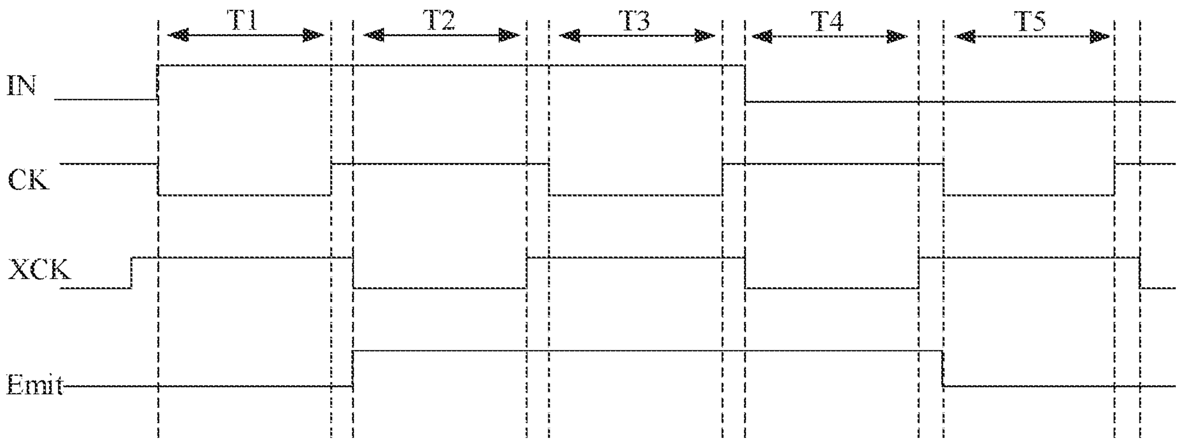
FIG. 21 is a timing sequence diagram provided by some embodiments of the present disclosure.

FIG. 21 is a timing sequence diagram provided by some embodiments of the present disclosure. In some embodiments, in combination with FIG. 3 and FIG. 4, as shown in FIG. 21, a working process of the light-emitting shift circuit 3 includes a first period t1 to a fifth period t5.

During the first period t1, the shift control signal line IN provides a high level, the first clock signal line CK provides a low level, the second clock signal line XCK provides a high level, the eleventh transistor M11 writes a low level provided by the first fixed potential signal line VGL to the fourth node N4, the sixth transistor M6 is controlled to be turned on, and the sixth transistor M6 writes the high level provided by the second clock signal line XCK to the gate electrode of the seventh transistor M7 to control the seventh transistor M7 to be turned off. At this time, a high level at the third node N3 provided during a previous driving cycle controls the tenth transistor M10 to be turned off. The fourth transistor M4 writes the high level provided by the shift control signal line IN to the first node N1, and the ninth transistor M9 is controlled to be turned off. At this time, the light-emitting shift circuit 3 maintains the high level output during the previous driving cycle.

During the second period t2, the shift control signal line IN provides a high level, the first clock signal line CK provides a high level, the second clock signal line XCK provides a low level, the seventh transistor M7 is turned on to transmit the low level of the fourth node N4 to the third node N3, and the tenth transistor M10 is controlled to be turned on, to transmit the high level provided by the second fixed potential signal line to the light-emitting control signal line Emit.

During the third period t3, the shift control signal line IN provides a high level, the first clock signal line CK provides a low level, the second clock signal line XCK provides a high level, and the light-emitting shift circuit 3 continuously outputs a high level.

During the fourth period t4, the shift control signal line IN provides a low level, the first clock signal line CK provides a high level, and the second clock signal line XCK provides a low level, and the light-emitting shift circuit 3 continuously outputs a high level.

During the fifth period t5, the shift control signal line IN provides a low level, the first clock signal line CK provides a low level, the second clock signal line XCK provides a high level, and the eighth transistor M8 is turned on, a level is written to the fourth node N4, the sixth transistor M6 is controlled to be turned on and writes the high level provided by the second clock signal line XCK to the gate electrode of the seventh transistor M7, to control the seventh transistor M7 to be turned off. The fourth transistor M4 is turned on, the low level provided by the shift control signal line IN is written to the first node N1, the ninth transistor M9 is controlled to be turned on, and the low level provided by the first fixed potential signal line VGL is written to the light-emitting control signal line Emit. At the same time, when the output terminal of the light-emitting shift circuit 3 jumps from high to low, due to the effect of the coupling, the potential of the first node N1 will be pulled to a lower level, the ninth transistor M9 will be more fully turned on, and low level provided by the first fixed potential signal line has a relatively small voltage drop when being transmitted to the light-emitting control signal line Emit via the ninth transistor M9, so that the voltage on the light-emitting control signal line Emit is closer to the low level provided by the first fixed potential signal line VGL.

Figure 22:
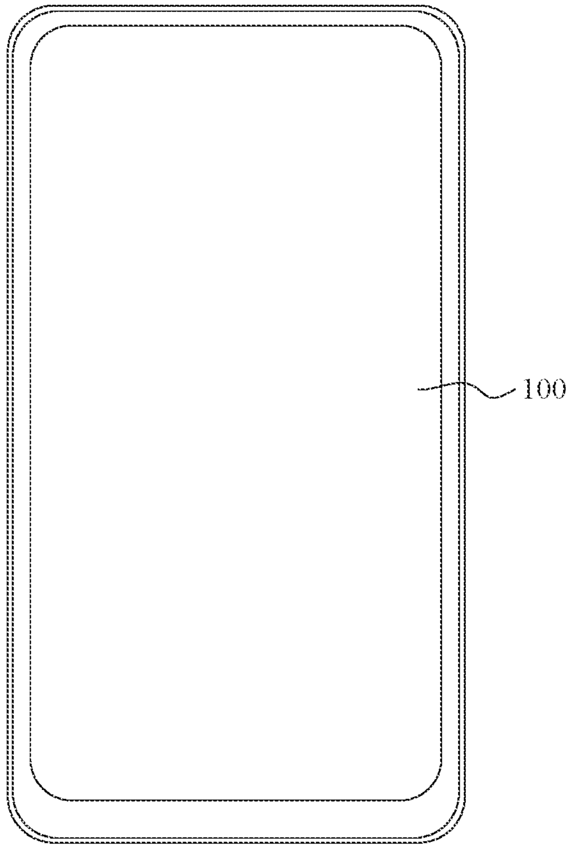
FIG. 22 is a schematic diagram of a display device provided by some embodiments of the present disclosure.

Based on the same inventive concept, some embodiments of the present disclosure also provide a display device. FIG. 22 is a schematic diagram of a display device provided by some embodiments of the present disclosure. In some embodiments, as shown in FIG. 22, the display device includes the display panel 100 descried above. The structure of the display panel 100 has been described in detail in the above embodiments, and will not be repeated herein. The display device shown in FIG. 22 is only a schematic illustration, and the display device can be any electronic device with a display function, such as a mobile phone, a tablet computer, a notebook computer, an electronic paper book, or a television.

The above are merely some embodiments of the present disclosure, rather than limiting the present disclosure. Any modification, equivalent substitution, improvement, and so on, made within the principles of the present disclosure shall fall within a scope of the present disclosure.

It should be noted that the above embodiments are merely used to illustrate the technical solutions of the present disclosure, rather than limit the technical solutions of the present disclosure. Although the present disclosure is described in detail with reference to the foregoing embodiments, those skilled in the art shall understand that they can modify the technical solutions described in the foregoing embodiments, or make equivalent replacement to some or all of the technical features. These modifications or replacements shall fall within a scope of the technical solutions of the embodiments of the present disclosure without departing from the concept of the corresponding technical solutions.

What is claimed is:

1. A display panel, comprising:

a substrate; and a circuit layer located at a side of the substrate and comprising a light-emitting shift circuit; and a top light-shielding layer configured to receive a voltage signal, wherein the light-emitting shift circuit comprises:

a first output module, wherein the first output module is electrically connected to a first node, a first fixed potential signal line, and a light-emitting control signal line, and is configured to, in response to a voltage of the first node, transmit a light-emitting enable voltage provided by the first fixed potential signal line to the light-emitting control signal line; and at least one control module electrically connected to the first node and comprising at least one control transistor;

wherein the top light-shielding layer is located at a side of the at least one control transistor facing away from the substrate, and, in a direction perpendicular to a plane of the substrate, the top light-shielding layer overlaps with a channel of one or more of the at least one control transistor, wherein the top light-shielding layer is arranged at one side of the channel adjacent to a light-exiting side of the display panel.

2. The display panel according to claim 1, wherein the at least one control module comprises a first control module, wherein the at least one control transistor of the first control module comprises a first transistor and a second transistor;

wherein the first transistor comprises a gate electrode electrically connected to a first clock signal line, a first electrode electrically connected to a shift control signal line, and a second electrode electrically connected to a second node; and the second transistor comprises a gate electrode and a first electrode that are electrically connected to the second node, and a second electrode electrically connected to the first node; and wherein the top light-shielding layer comprises a first top light-shielding layer overlapping with a channel of the second transistor in the direction perpendicular to the plane of the substrate.

3. The display panel according to claim 2, wherein the at least one control transistor of the first control module further comprises a third transistor, wherein the third transistor comprises a gate electrode electrically connected to the second node, and a first electrode electrically connected to a second clock signal line, and a second electrode;

wherein the first control module further comprises a first capacitor, wherein the first capacitor comprises a first electrode plate electrically connected to the second node, and a second electrode plate electrically connected to the second electrode of the third transistor; and wherein the first top light-shielding layer overlaps with a channel of the third transistor in the direction perpendicular to the plane of the substrate.

4. The display panel according to claim 3, wherein the first top light-shielding layer is reused as the first electrode plate or the second electrode plate of the first capacitor.

5. The display panel according to claim 3, wherein the first top light-shielding layer is electrically connected to the second electrode plate of the first capacitor, or is electrically connected to the second node.

6. The display panel according to claim 1, wherein the at least one control module comprises a second control module, and the at least one control transistor of the second control module comprises a fourth transistor, wherein the fourth transistor comprises a gate electrode electrically connected to a first clock signal line, and a first electrode electrically connected to a shift control signal line, and a second electrode electrically connected to the first node; and wherein the top light-shielding layer comprises a second top light-shielding layer overlapping with a channel of the fourth transistor in the direction perpendicular to the plane of the substrate.

7. The display panel according to claim 1, wherein the at least one control module comprises a third control module, and the at least one control transistor of the third control module comprises a fifth transistor, wherein the fifth transistor comprises a gate electrode electrically connected to a first control signal line, a first electrode electrically connected to a second fixed potential signal line, and a second electrode electrically connected to the first node; and wherein the top light-shielding layer comprises a third top light-shielding layer overlapping with a channel of the fifth transistor in the direction perpendicular to the plane of the substrate.

8. The display panel according to claim 1, wherein the light-emitting shift circuit further comprises a first driving module, wherein the first driving module comprises a sixth transistor, a seventh transistor, and a second capacitor, wherein the second capacitor comprises a first electrode plate electrically connected to a fourth node, and a second electrode plate; the sixth transistor comprises a gate electrode electrically connected to the fourth node, a first electrode electrically connected to a second clock signal line, and a second electrode electrically connected to the second electrode plate of the second capacitor; and the seventh transistor comprises a gate electrode electrically connected to the second clock signal line, a first electrode electrically connected to the second electrode of the sixth transistor, and a second electrode electrically connected to a third node;

wherein the at least one control module comprises a fourth control module, and the at least one control transistor of the fourth control module comprises an eighth transistor, wherein the eighth transistor comprises a gate electrode electrically connected to the first node, a first electrode electrically connected to a first clock signal line, and a second electrode electrically connected to the fourth node; and wherein the top light-shielding layer comprises a fourth top light-shielding layer overlapping a channel of the eighth transistor in the direction perpendicular to the plane of the substrate.

9. The display panel according to claim 1, wherein the top light-shielding layer is configured to receive a constant voltage signal.

10. The display panel according to claim 1, wherein the top light-shielding layer is electrically connected to the first node.

11. The display panel according to claim 1, further comprising:

a light-emitting element layer located at a side of the circuit layer facing away from the substrate, wherein the light-emitting element layer comprises an anode, a light-emitting layer located at a side of the anode facing away from the substrate, and a cathode located at a side of the light-emitting layer facing away from the substrate, wherein the cathode is electrically connected to a negative power bus through an auxiliary connection part, and the top light-shielding layer is located between the at least one control transistor and the auxiliary connection part.

12. The display panel according to claim 1, further comprising:

a light-emitting element layer located at a side of the circuit layer facing away from the substrate, wherein the light-emitting element layer comprises an anode, a light-emitting element layer located at a side of the anode facing away from the substrate, and a cathode located at a side of the light-emitting element layer facing away from the substrate, wherein the top light-shielding layer and the anode are arranged in a same layer.

13. The display panel according to claim 12, wherein the cathode is electrically connected to a negative power bus through an auxiliary connection part, and the top light-shielding layer is reused as the auxiliary connection part.

14. The display panel according to claim 13, wherein the top light-shielding layer comprises openings that do not overlap with a channel of the at least one control transistor in the direction perpendicular to the plane of the substrate.

15. The display panel according to claim 1, wherein the first output module comprises a ninth transistor, wherein the ninth transistor comprises a gate electrode electrically connected to the first node, a first electrode electrically connected to the first fixed potential signal line, and a second electrode electrically connected to the light-emitting control signal line; and the top light-shielding layer overlaps with a channel of the ninth transistor in the direction perpendicular to the plane of the substrate.

16. The display panel according to claim 1, wherein the light-emitting shift circuit further comprises a second output module, wherein the second output module comprises a tenth transistor, wherein the tenth transistor comprises a gate electrode electrically connected to a third node, a first electrode electrically connected to a second fixed potential signal line, and a second electrode electrically connected to the light-emitting control signal line; and the top light-shielding layer overlaps with a channel of the tenth transistor in the direction perpendicular to the plane of the substrate.

17. The display panel according to claim 1, further comprising:

a bottom light-shielding layer located at a side of the least one control transistor facing towards the substrate, wherein the bottom light-shielding layer overlaps with a channel of one or more of the at least one control transistor in the direction perpendicular to the plane of the substrate.

18. The display panel according to claim 17, wherein the first output module comprises a ninth transistor, wherein the ninth transistor comprises a gate electrode electrically connected to the first node, a first electrode electrically connected to the first fixed potential signal line, and a second electrode electrically connected to the light-emitting control signal line;

wherein the light-emitting shift circuit further comprises a second output module, wherein the second output module comprises a tenth transistor, wherein the tenth transistor comprises a gate electrode electrically connected to a third node, a first electrode electrically connected a second fixed potential signal line, and a second electrode electrically connected to the light-emitting control signal line; and wherein the bottom light-shielding layer overlaps with at least one of a channel of the ninth transistor or a channel of the tenth transistor in the direction perpendicular to the plane of the substrate.

19. The display panel according to claim 17, wherein the bottom light-shielding layer is configured to receive a power supply voltage or a ground voltage.

20. A display device, comprising a display panel, wherein the display panel comprises:

a substrate; and a circuit layer located at a side of the substrate and comprising a light-emitting shift circuit; and a top light-shielding layer configured to receive a voltage signal, wherein the light-emitting shift circuit comprises:

a first output module, wherein the first output module is electrically connected to a first node, a first fixed potential signal line, and a light-emitting control signal line, and is configured to, in response to a voltage of the first node, transmit a light-emitting enable voltage provided by the first fixed potential signal line to the light-emitting control signal line; and at least one control module electrically connected to the first node and comprising at least one control transistor;

wherein the top light-shielding layer is located at a side of the at least one control transistor facing away from the substrate, and, in a direction perpendicular to a plane of the substrate, the top light-shielding layer overlaps with a channel of one or more of the at least one control transistor, wherein the top light-shielding layer is arranged at one side of the channel adjacent to a light-exiting side of the display panel.

* * * * *